US008705084B2

(12) United States Patent
Osada

(10) Patent No.: US 8,705,084 B2
(45) Date of Patent: Apr. 22, 2014

(54) IMAGE PROCESSING SYSTEM, IMAGE PROCESSING APPARATUS AND METHOD FOR CONTROLLING THE SAME

(75) Inventor: Tomoaki Osada, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 597 days.

(21) Appl. No.: 12/464,017

(22) Filed: May 11, 2009

(65) Prior Publication Data

US 2009/0284791 A1 Nov. 19, 2009

(30) Foreign Application Priority Data

May 13, 2008 (JP) ................................ 2008-125935

(51) Int. Cl.
*G06F 3/12* (2006.01)
*G06K 15/00* (2006.01)

(52) U.S. Cl.
USPC .......... 358/1.15; 358/1.16; 358/1.9; 358/448; 358/524; 358/523; 709/216

(58) Field of Classification Search
USPC ................................ 358/1.15, 1.16; 709/216
See application file for complete search history.

(56) References Cited

U.S. PATENT DOCUMENTS

| 6,845,394 B2 * | 1/2005 | Ritche ............................ 709/221 |
| 2003/0149794 A1 * | 8/2003 | Morris et al. .................. 709/249 |
| 2004/0028377 A1 | 2/2004 | Inakura |
| 2006/0190553 A1 * | 8/2006 | Kojima ......................... 709/216 |
| 2008/0175190 A1 * | 7/2008 | Lee et al. ...................... 370/328 |

FOREIGN PATENT DOCUMENTS

| JP | 03-196349 A | 8/1991 |
| JP | 07-225724 A | 8/1995 |
| JP | 11-110325 A | 4/1999 |
| JP | 2004-23617 A | 1/2004 |
| JP | 2006-031576 A | 2/2006 |
| JP | 2006-215594 A | 8/2006 |
| JP | 2006-235990 A | 9/2006 |
| JP | 2007-042099 A | 2/2007 |
| JP | 2007-258892 A | 10/2007 |
| JP | 2008-123496 A | 5/2008 |

* cited by examiner

*Primary Examiner* — Steven Kau
*Assistant Examiner* — Quang N Vo
(74) *Attorney, Agent, or Firm* — Canon USA Inc. IP Division

(57) ABSTRACT

An image processing system includes a first image processing apparatus and a plurality of other image processing apparatuses that are connected with each other via a network. The image processing system includes a sharing unit included in at least the plurality of other image processing apparatuses and configured to store information stored in a storage unit of the first image processing unit to share the information, a determination unit configured to determine an image processing apparatus to use the information to be shared from the plurality of other image processing apparatuses when the first image processing apparatus is not available, and an alternative operation unit configured to perform an alternative operation for a function of the first image processing apparatus using the information shared by the sharing unit of the image processing apparatus determined by the determination unit.

7 Claims, 30 Drawing Sheets

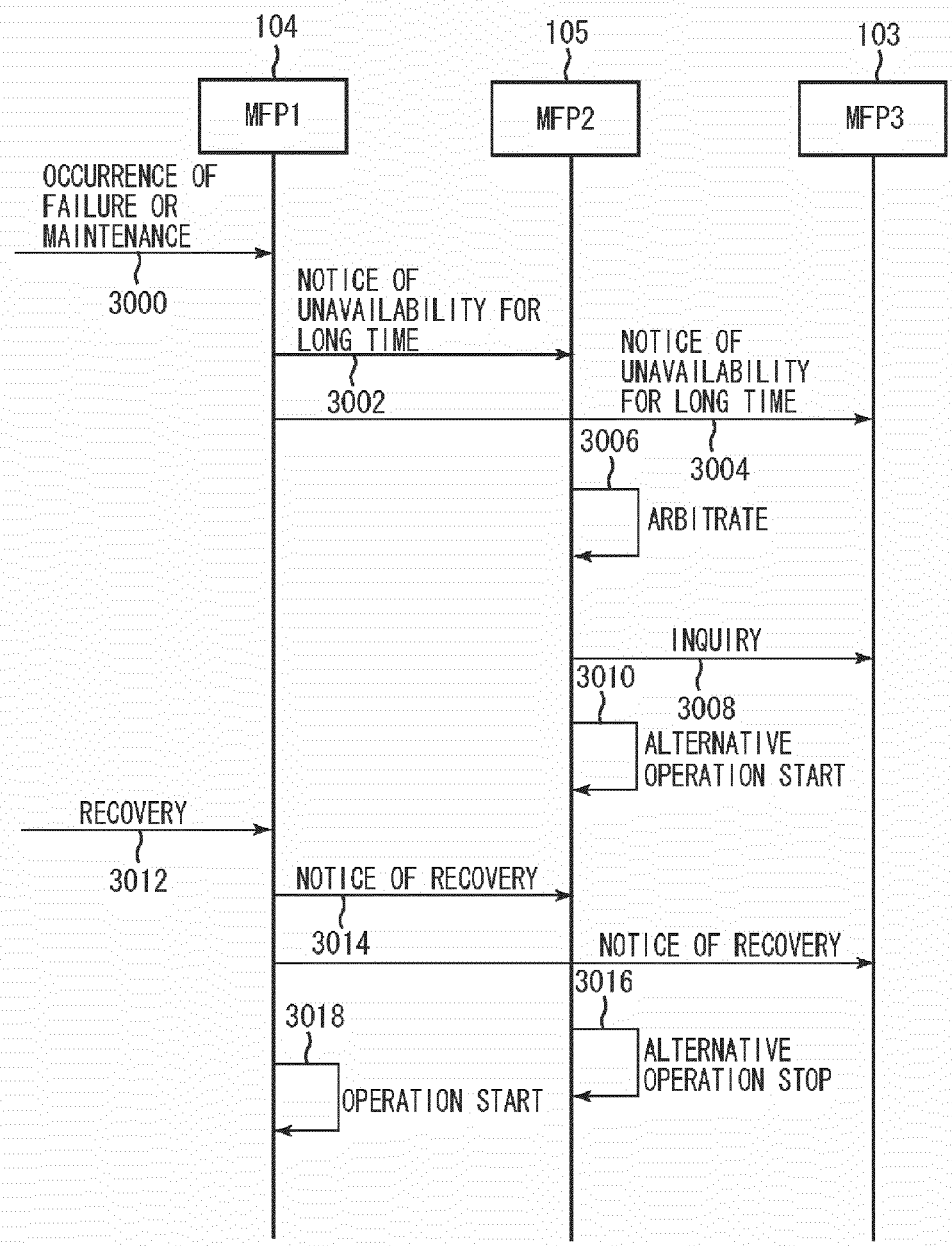

IMAGE PROCESSING SYSTEM, IMAGE PROCESSING APPARATUS AND METHOD FOR CONTROLLING THE SAME

BACKGROUND OF THE INVENTION

1. Field of the Invention

The present invention relates to an image processing system, an image processing apparatus and a method for controlling the same.

2. Description of the Related Art

In recent years, office networking has been developed among many companies. More specifically, it is becoming common to build an office system in which office automation (OA) equipment including a personal computer (PC) and a multifunction peripheral (MFP) are connected with each other via a network to share and use the MFP according to intended use. In many cases, the MFP is equipped with a storage device. The storage device stores various types of data including personal setting information of the user (e.g., address book for transmission and individually customized information) and printing data.

Conventionally, the MFP has optional functions that are not available in an initial state of the product. Such optional functions can be available for a user paying an extra cost. One of methods for providing the optional function is giving a license.

When a license or authorization is given, a part of functions which is previously invalidated in programs stored in an MFP is validated. Thereafter, the function can be used as an optional function. Such an optional function includes a web browser function, a copy-forgery-inhibited pattern printing function and a direct print function. License information for validating the optional function is also stored in the storage device.

As another method, the optional function may be provided by using an application program (hereinafter referred to as an application). More specifically, an application program is additionally installed in the MFP to add the function later. Recent printer apparatuses (image processing apparatuses) have been equipped with a mechanism (function) for downloading a program which operates on a platform, typically JAVA® and Linux®, from a communication line such as a network and storing the program in the storage device to use it.

When a failure occurs in an MFP in which various types of data and license information are stored and an application has been installed, these data, license information, and application cannot be used. In this case, a user tries to alternatively execute the application on another MFP. It takes much time to manually transfer the various types of data and application to the other MFP. Further, if the failure occurs in the storage device which stores the various types of data and application of the MFP, the application and data cannot be transferred. Thus, the application cannot be executed on the other MFP.

A conventional technique for storing backup data in a server on a network is discussed in, for example, Japanese Patent Application Laid-Open No. 2006-215594.

Another conventional technique for storing backup data in a storage device equipped in another MFP in an office system is discussed in, for example, Japanese Patent Application Laid-Open No. 2004-23617.

However, according to the above-described techniques, only the data is backed up, in a case where a failure occurs in the MFP or in the storage device equipped in the MFP. Thus, a user (or a service engineer) needs to manually restore the license information and application of the MFP whose main body (or storage device) is in a failure state, in another MFP as an alternative apparatus.

SUMMARY OF THE INVENTION

The present invention is directed to a method for quickly and easily enabling an alternative image processing apparatus to use information including data, an application and license information, even when a failure occurs in an image processing apparatus.

According to an aspect of the present invention, an image processing system including a first image processing apparatus and a plurality of other image processing apparatuses which are connected with each other via a network includes a sharing unit included in at least the plurality of other image processing apparatuses and configured to share information by storing information stored in a storage unit of the first image processing unit, a determination unit configured to determine an image processing apparatus to use the information to be shared, from among the plurality of other image processing apparatuses when the first image processing apparatus is not available, and an alternative operation unit configured to perform an operation replacing a function of the first image processing apparatus using the information shared by the sharing unit of the image processing apparatus determined by the determination unit.

According to another aspect of the present invention, an image processing apparatus capable of communicating with an external image processing apparatus via a network includes a sharing unit configured to share information stored in a storage unit of the external image processing apparatus, a determination unit configured to determine whether to make the information shared by the sharing unit available when the external image processing apparatus is not available, and an alternative operation unit configured to perform an operation replacing the external image processing apparatus using the information shared by the sharing unit when the determination unit determines to make the information shared by the sharing unit available.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 21A illustrates a process for storing and sending a selection result, and FIG. 21B illustrates a process for receiving a sharing mode of license free data or application from another MFP.

FIG. 30 is a sequence diagram illustrating a process from start to end of an alternative operation in another MFP when a failure or maintenance occurs in an MFP.

DETAILED DESCRIPTION OF THE EMBODIMENTS

Various exemplary embodiments, features, and aspects of the invention will be described in detail below with reference to the drawings.

Figure 1:
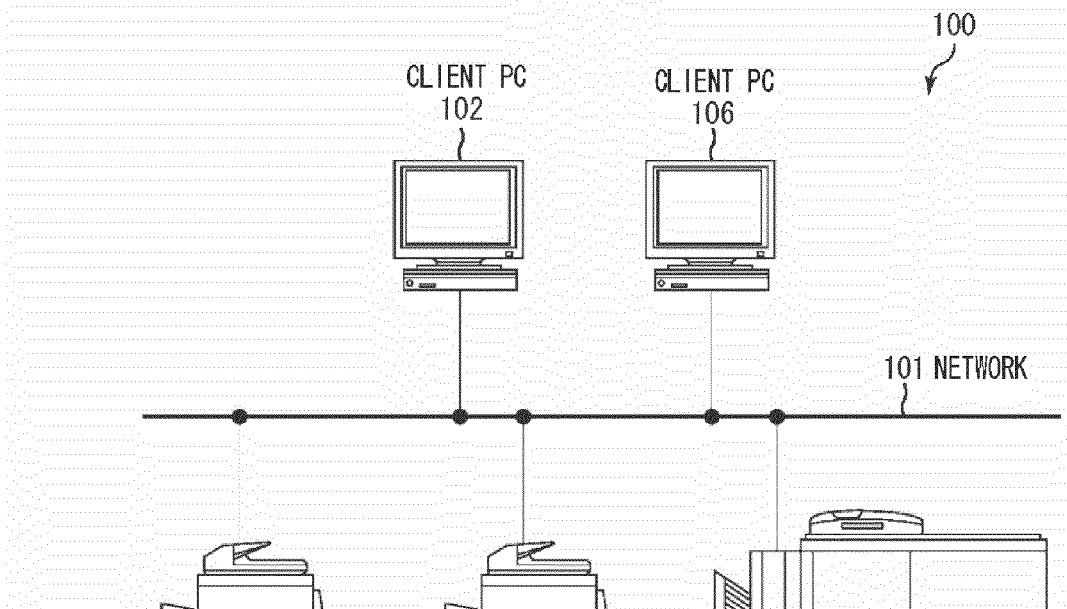
FIG. 1 is a block diagram illustrating a configuration example of an office system as an image processing system according to an embodiment of the present invention.

FIG. 1 is a block diagram illustrating a configuration example of an office system as an image processing system according to an embodiment of the present invention.

In FIG. 1, an office system 100 includes a plurality of information processing apparatuses (client PC 102 and 106) and a plurality of image processing apparatuses (monochrome MFP3 103, color MFP1 104, and color MFP2 105). The processors and the image processing apparatuses are connected with each other via a network 101. FIG. 1 illustrates an example of the office system configuration. Types and numbers of the information processing apparatuses and the image processing apparatuses of the office system may vary according to an office for installation.

The client PC 102 is an information processing apparatus for editing an input application file, issuing a printing instruction to MFPs, and submitting a print ready file. The client PC 106 can also edit a file, and instruct to print a file.

The monochrome MFP3 103, the color MFP1 104, and the color MFP2 105 have various functions, such as a scan function, a print function, and a copy function as an image processing apparatus. The scan function is to read images from a document. The print function is to print images on recording paper. The copy function is to copy document images on recording paper. In the following descriptions, the monochrome MFP3 103, the color MFP1 104 and the color MFP2 105 are denoted respectively by MFP 103, MFP 104 and MFP 105.

Figure 3:
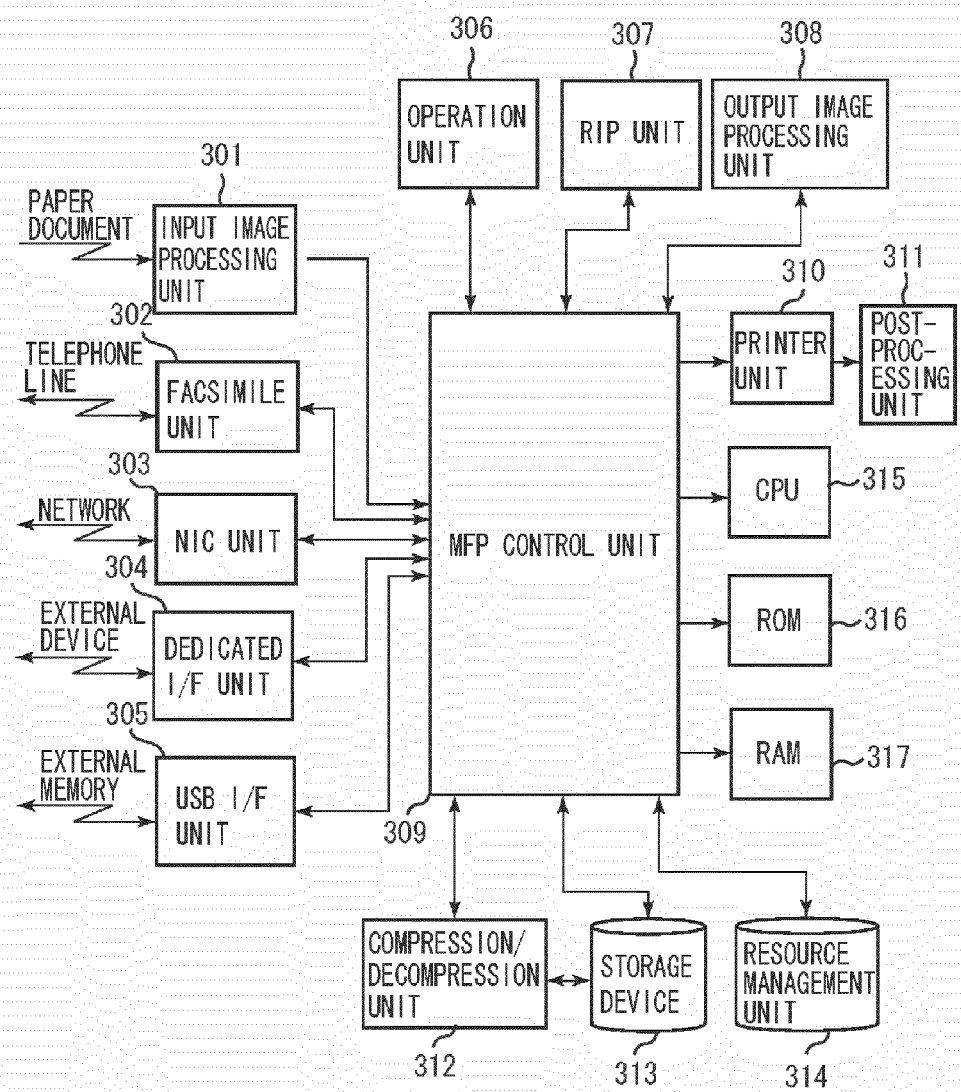
FIG. 3 is a block diagram illustrating a detailed configuration of an MFP in the office system.

FIG. 3 is a block diagram illustrating a configuration of an MFP.

In FIG. 3, the MFP includes an input image processing unit 301, an MFP control unit 309, a printer unit 310, a storage device 313, a central processing unit (CPU) 315, a read only memory (ROM) 316 and a random access memory (RAM) 317. The MFP has a plurality of functions, such as a copy function and a print function. The copy function is to print read data of a paper document output from the input image processing unit 301 via the printer unit 310. The print function is to rasterize printing data supplied from an external device and to print the data via the printer unit 310.

As described above, there are both monochrome MFP 103 and the full color MFPs 104 and 105. The full color MFP often includes the configuration of the monochrome MFP in its basic function, except color processing and internal data or the like. In the present embodiment, the full color MFP will mainly be described, and the monochrome MFP will additionally be described as needed.

The CPU 315 realizes the following functions by sequentially reading and executing programs stored in the ROM 316 or the storage device 313 in the RAM 317. The CPU 315 executes processes illustrated in the following sequence diagrams and flowcharts based on the programs. The RAM 317 is used as a main storage device. The ROM 316 stores the programs. An operation unit 306 includes a display unit for displaying screens illustrated in FIG. 9, FIG. 18, FIG. 19, FIG. 22 and FIG. 29, various buttons and various keys.

The printer unit 310 performs a printing operation. A post-processing unit 311 performs a post-processing (assorting process, finishing process) on recording paper after printed. The input image processing unit 301 reads images on a paper document or the like, and executes image processing for the read image data. A facsimile unit 302 is configured as a facsimile machine that sends and receives image data using a telephone line.

A network interface card (NIC) unit 303 exchanges image data and device information with an external device, e.g., a computer using a network. A dedicated interface (I/F) unit 304 exchanges information, e.g., image data with an external device. A universal serial bus (USB) interface (I/F) unit 305 sends and receives image data or the like to and from a USB unit, such as a USB memory that is one type of removable media. The memory unit 313 includes a memory, such as a hard disk that can store applications and license information in addition to a plurality of pieces of image data.

The MFP control unit 309 controls a data flow by temporarily storing image data and determining a data transmission path according to usage of the MFP. The MFP control unit 309 causes the storage device 313 to store a plurality of pieces of image data which are input from, for example, the input image processing unit 301 and an external device, such as a computer via the NIC unit 303.

The MFP control unit 309 appropriately reads the image data stored in the storage device 313, transfers the data to an output image processing unit 308, and controls the printer unit 310 to execute a printing process. The MFP control unit 309 transfers the image data read from the storage device 313 to an external unit such as a client PC or another MFP in response to an instruction from an operator.

A compression/decompression unit 312 compresses image data as needed when the image data is stored in the storage device 313. The compression/decompression unit 312 decompresses the compressed image data to recover the original data when the image data compressed and stored in the storage device 313 is read. Generally, data compressed in a joint photographic experts group (JPEG) format, a joint bi-level image experts group (JBIG) format, and a ZIP format is used to transmit the data via a network. When data is input to an MFP via a network, the data is decompressed (extracted) in the compression/decompression unit 312.

A resource management unit 314 stores commonly handled parameter tables, such as fonts, color profiles, and a gamma table. Thus stored data can be read as needed. Further, the resource management unit 314 can store a new parameter table and correct and update the parameter table.

The MFP control unit 309 controls a raster image processing (RIP) unit 307 to execute a RIP process when page description language (PDL) data is input to the MFP. The MFP control unit 309 executes image processing on image data to be printed using the output image processing unit 308, as needed. The storage device 313 can store intermediate data or print ready data (bitmap data for printing or the compressed bitmap data) of the image data generated at this time as needed.

The image data to be printed is sent to the printer unit 310. The recording paper printed out by the printer unit 310 is supplied to the post-processing unit 311 so as to be assorted and finished.

The MFP also has an optional function which is not available in an initial state of the product and can be used in response to an operation of an option switch. To activate the optional function, license information is necessary. The license information for activating the operation function is stored in the storage device 313.

An application may be installed in the MFP as another method for adding a function to the MFP. The application is installed to add and use a function later that is not previously equipped in the MFP. The additionally installed application is also stored in the storage device 313.

Figure 4:
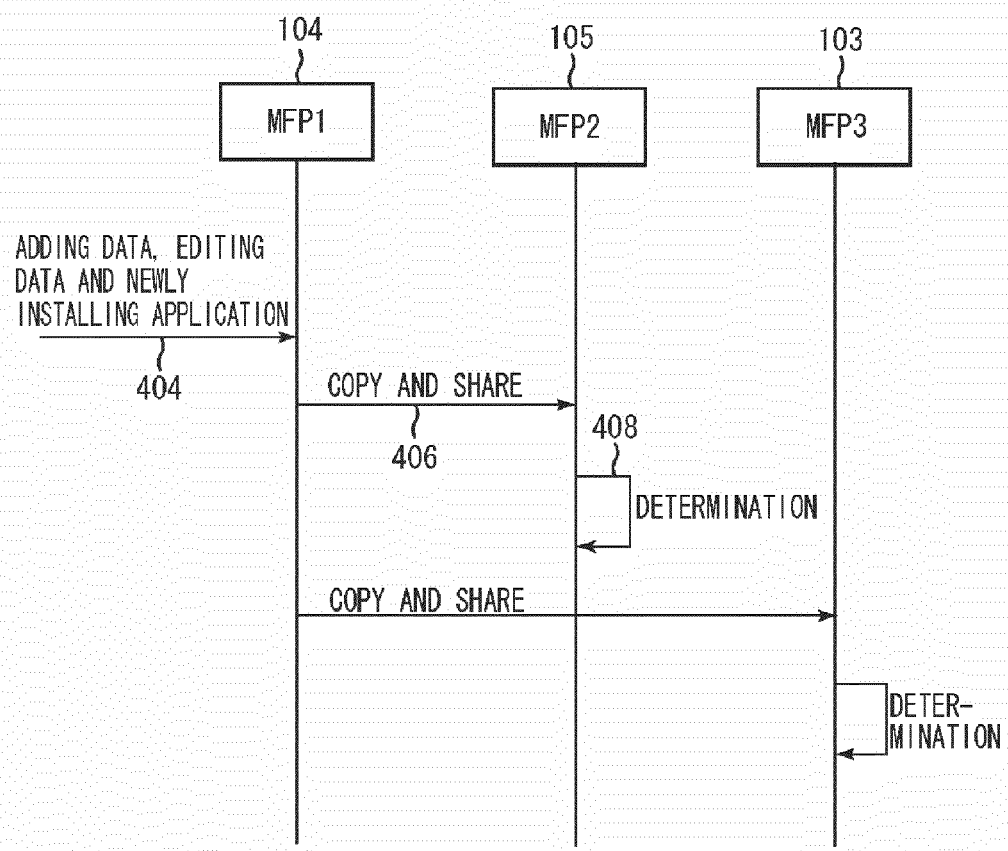
FIG. 4 is a sequence diagram illustrating a process to be executed when data is added and editing data and an application is newly installed in the MFP of the office system.

Communication among the MFPs 103, 104 and 105 included in the office system 100 of the present embodiment is described with reference to FIG. 2, FIG. 4 and FIG. 30. Each process is realized and executed by the CPU 315 of each of the MFPs 103, 104 and 105. Each process will be described in detail below.

Each processing flow for selecting an arbitration mode, selecting shared data and selecting a sharing mode in the office system 100 will be described with reference to FIG. 2. The process for selecting the arbitration mode will be described below with reference to FIGS. 15 to 20. The process for selecting shared data will be described below with reference to FIGS. 9 and 10. The process for selecting the sharing mode will be described below with reference to FIGS. 21 and 22.

Figure 2:
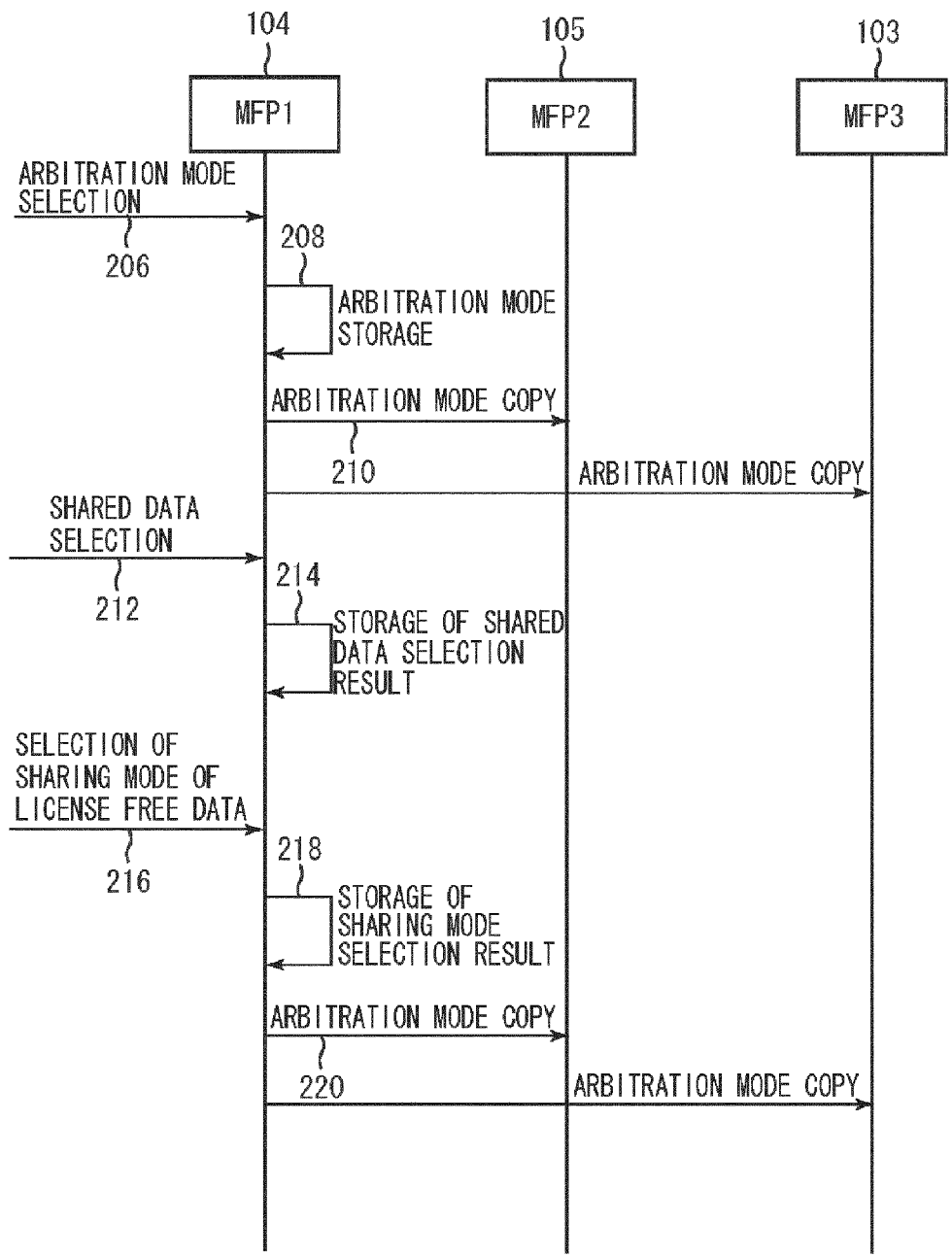
FIG. 2 is a sequence diagram illustrating processes for selecting an arbitration mode, for selecting shared data, and for selecting a sharing mode in the office system.

The processes illustrated in FIG. 2 are executed during normal operations of the MFP 104, the MFP 105 and the MFP 103. Further, the operations are executed at arbitrary timing in response to a user instruction. The processes for selecting the arbitrary mode, selecting the shared data, and selecting the sharing mode are independently executed at arbitrary timings respectively in response to user instructions. In the present embodiment, a user operation on the MFP 104 is described as an example. However, the user operation is not limited to the MFP 104. The user may operate on any of the MFP 103, the MFP 104 and the MFP 105 in the office system 100.

Figure 29:
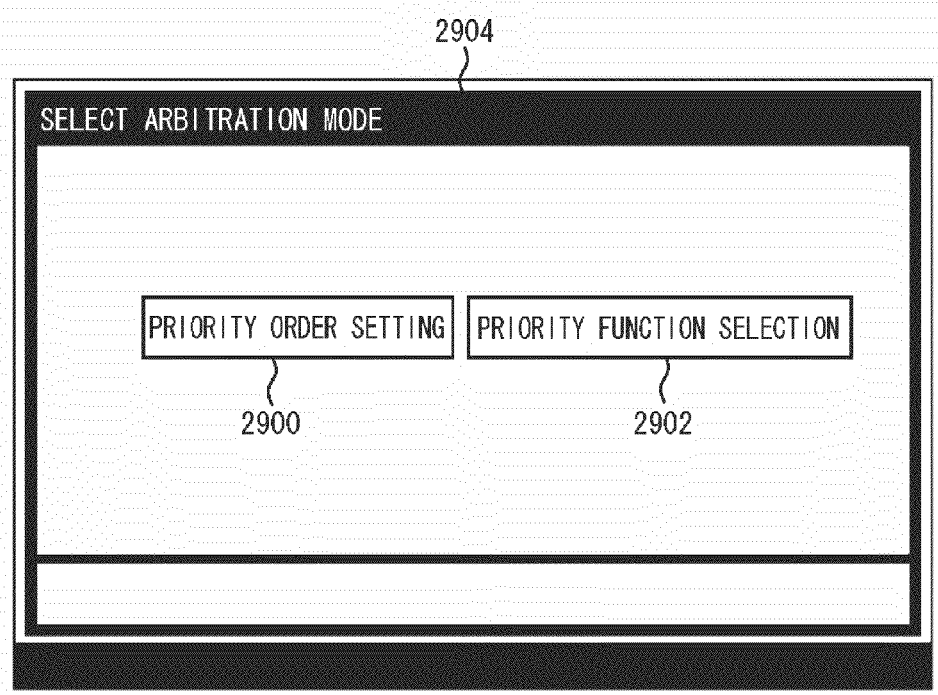
FIG. 29 illustrates an example of an arbitration mode selection screen.

In a process 206, the user opens an arbitration mode selection screen illustrated in FIG. 29 on the display unit of the operation unit 306 of the MFP 104. The user selects the arbitration mode from a priority order setting button 2900 and a priority function selection button 2902 that are displayed on the arbitrary mode selection screen. In a process 208, a selection result of the arbitration mode is stored in the storage device 313 of the MFP 104. In a process 210, the selection result of the arbitration mode is copied to the MFP 105 and the MFP 103 in the office system 100. The processes 206, 208 and 210 will be described in detail below with reference to FIGS. 15 to 17.

In a process 212, the user selects data to be shared among the MFP 103, the MFP 104 and the MFP 105 in the office system 100 using the operation unit 306 of the MFP 104. In a process 214, a selection result of the shared data is stored in the storage device 313 of the MFP 104. The processes 212 and 214 will be described in detail below with reference to FIG. 10.

In a process 216, the user selects the sharing mode using the operation unit 306 of the MFP 104. Selection of the sharing mode is to select a mode in which license free applications and data are available among the all MFPs in the office system 100. In a process 218, a selection result of the sharing mode is stored in the storage device 313 of the MFP 104. In a process 220, the selection result of the sharing mode is copied to the MFP 105 and the MFP 103 in the office system 100. Processes 216, 218 and 220 will be described in detail below with reference to FIG. 21.

Processing flows for adding data, editing data, and newly installing an application in the arbitrary one of the MFPs 103, 104 and 105 in the office system 100 (image processing system) will be described with reference to FIG. 4. The processes will be described in detail below with reference to FIGS. 5 to 8. In the present embodiment, addition of data, edition of data, and installation of an application in the MFP 104 will be described as examples. However, the processes are not limited to the MFP 104. The addition of data, the edition of data, and the installation of an application may be performed in any one of the MFPs 103, 104 and 105 in the office system.

In a process 404, the user adds data, edits data and installs an application in the MFP 104 via the operation unit 306. In a process 406, the data and application are copied to be shared among the MFPs 103 and 105 in the office system. The shared copy will be described in detail below with reference to FIG. 5.

In determination 408, a following process is executed according to the selection result of the sharing mode in the process 216 in FIG. 2. The shared copy of the data and application can be available in the MFP 105 when the sharing mode is selected in which the license free data and application are available in other MFPs. When the sharing mode in which the license free data and application are available in other MFPs is not selected, the shared copy of the data and application are not made available.

With reference to FIG. 30, a processing flow when one of the MFPs 103, 104 and 105 in the office system 100 is not available for a long period of time due to a failure or maintenance and the other MFP in the office system 100 executes an alternative operation will be described. The detail processes will be described below with reference to FIGS. 11 to 14, and FIGS. 23 to 28. In the present embodiment, a case where a failure or maintenance occurs in the MFP 104 is described as an example. However, the process is applicable to a case where a failure or maintenance occurs in any one of the MFPs 103, 104 and 105 in the office system 100.

It is assumed that, in a process 3000, a failure or maintenance occurs in the MFP 104, and the MFP 104 detects it. In processes 3002 and 3004, the MFP 104 notifies the MFPs 105 and 103 in the office system 100 that the MFP 104 is not available for a long period of time. The notifying process will be described in detail below with reference to FIGS. 11 to 13. As illustrated in FIG. 14, the other MFP 105 or 103 may detect the failure of the MFP 104 by performing a polling operation when the MFP 104 cannot send notice due to a degree of the failure thereof.

In a process 3006, the MFP 105 which has received the failure notice executes an arbitration process. The arbitration process is to cause a single MFP in the office system 100 to execute an alternative operation for data and an application requiring a license. The arbitration process will be described in detail below with reference to FIGS. 23 to 25. When it is necessary to send a capability inquiry to the MFP 103 in the arbitration process, a process 3008 is executed. The capability inquiry will be described in detail below with reference to FIGS. 25 and 26.

When it is determined that, for example, the MFP 105 executes the alternative operation as a result of the arbitration process, the alternative operation starts in a process 3010. A process 3012 is executed when the MFP 104 is repaired by a service engineer or the like and recovered. When the MFP 104 detects that own apparatus has recovered, the MFP 104 sends notice of recovery to the MFPs 105 and 103 in the office system 100 in a process 3014. The notice of recovery will be described in detail below with reference to FIG. 27.

If the MFP 105 performs the alternative operation when receiving the notice of recovery, the MFP 105 stops the alternative operation in a process 3016. The alternative operation stop will be described in detail below with reference to FIG. 28. The MFP 104 which has completed the notice of recovery starts a normal operation again.

Figure 5:
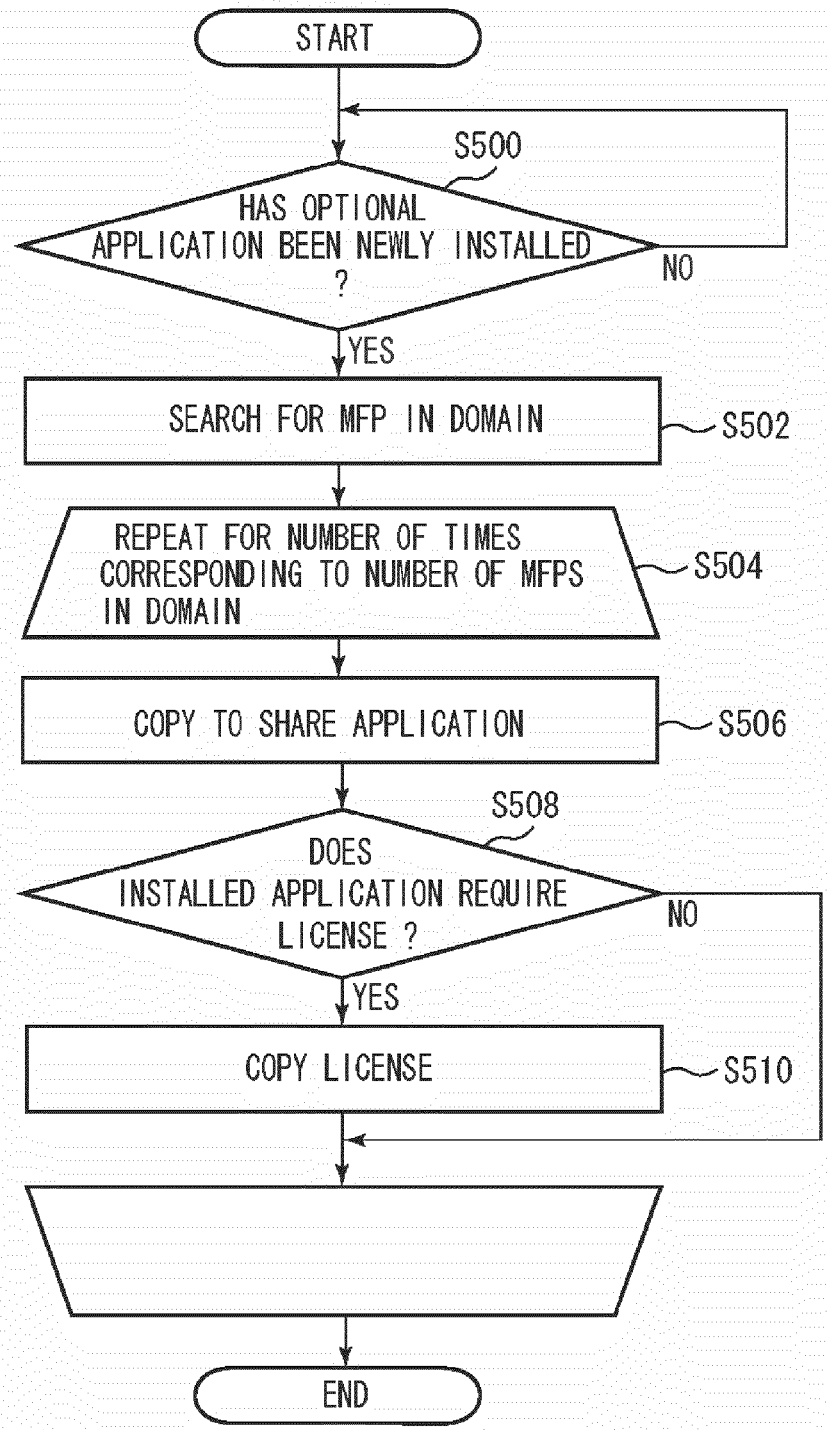
FIG. 5 is a flowchart illustrating a process for copying to share an application among a plurality of MFPs when the application is installed in an MFP.

A process for copying and sharing an application among the MFPs 103, 104 and 105 in the office system will be described with reference to FIG. 5. It is assumed that, as illustrated in FIG. 4, the application installed in the MFP 104 is copied to be shared with the MFPs 105 and 103 in the office system 100. The process is executed and realized by the CPU 315 in each of the MFPs 103, 104 and 105. In the following descriptions, the MFP 104 executes processing illustrated in the flowchart of FIG. 5.

The shared copy of the application is made in order to make the application available in the alternative MFPs 105 and 103, when the MFP 104 having the application installed therein is not available for a long period of time due to a failure or maintenance.

More specifically, the application is copied and a replication of the application is stored in to the storage device 313 equipped in the MFPs 103, 104 and 105 in the office system 100. Accordingly, the alternative operation can be executed in any of the MFPs 103, 104 and 105 in the office system 100. In the present embodiment, a shared copy function is executed using a groupware function that is previously installed in the all MFPs 103, 104 and 105 in the office system 100.

In step S500, the CPU 315 of the MFP 104 waits until a user newly installs an optional application. If the application is newly installed in the MFP 104 (YES in step S500), the process proceeds to step S502. In step S502, the CPU 315 of the MFP 104 searches for the MFPs 103 and 105 in a network domain. A loop process starts from step S504 to step S510, and is repeated for a number of times corresponding to a number of the MFPs 103 and 105 searched in step S502.

In step S506, the CPU 315 of the MFP 104 performs peer-to-peer communication with the MFP 103 or MFP 105 in which the data is copied to be shared. The application newly installed in the MFP 104 is copied to and shared with the MFP 103 or MFP 105.

In step S508, the CPU 315 of the MFP 104 determines whether the installed application requires a license. If the license is required (YES in step S508), the process proceeds to step S510, and the license is copied to be shared with the MFP 103 or MFP 105. When copying and sharing of the application and license are completed in both the MFPs 103 and 105 in the network domain, the process ends.

Figure 6:
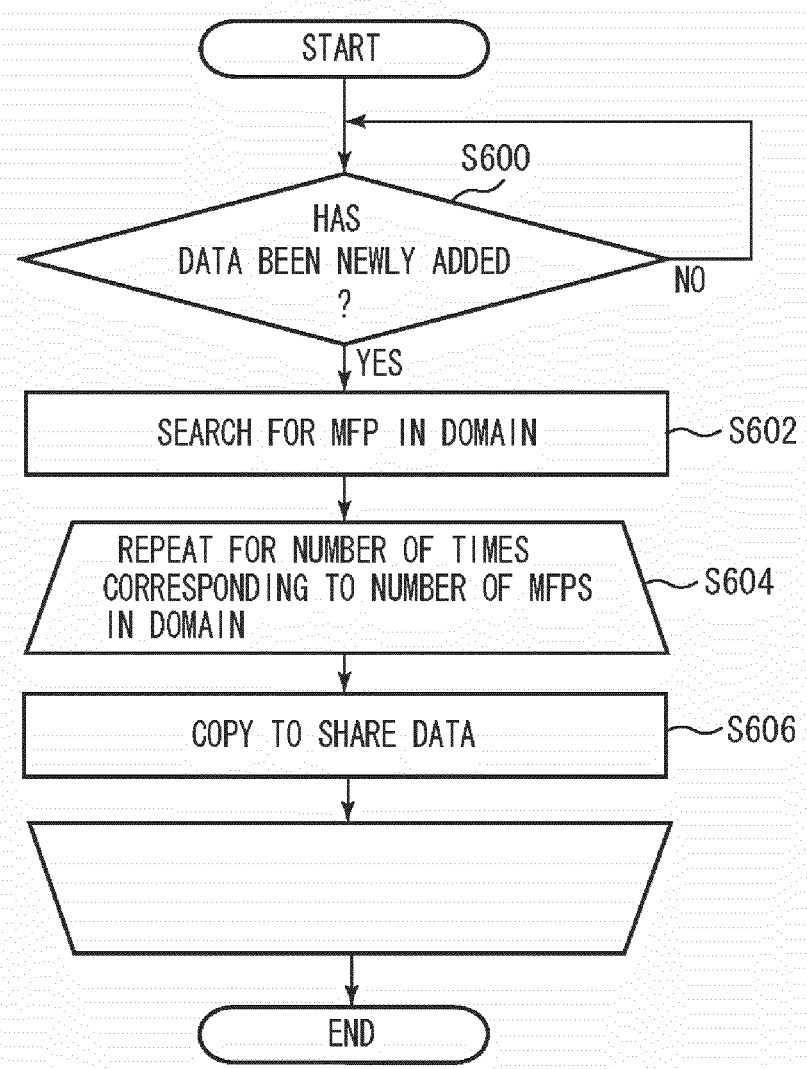
FIG. 6 is a flowchart illustrating a process for copying to share data among a plurality of MFPs when data is added in an MFP.

Next, a process for copying and sharing data among the MFPs 103, 104 and 105 in the office system 100 will be described with reference to FIG. 6. It is assumed that, as illustrated in FIG. 4, data added to the MFP 104 is copied to be shared with the MFPs 105 and 103 in the office system 100. The process is executed and realized by the CPU 315 of the MFPs 103, 104 and 105. In the following descriptions, the MFP 104 executes processing illustrated in the flowchart of FIG. 5.

The data stored in the MFPs 103, 104 and 105 includes address book data such as facsimile destinations and e-mail destinations, and image data stored in the storage device 313. The data described above is just an example and all pieces of data stored in the MFPs 103, 104 and 105 may be subjected to the shared copy.

Data is copied and shared in order to use the data in the alternative MFPs 103 and 105, when the MFP 104 having stored data is not available for a long period of time due to a failure or maintenance. The shared copy function is executed using the groupware function that is previously installed in the all MFPs 103, 104 and 105 in the office system 100.

In step S600, the CPU 315 of the MFP 104 waits until the user newly adds data. When new data is added to the MFP 104 (YES in step S600), the process proceeds to step S602. In step S602, the CPU 315 of the MFP 104 searches for the MFP 103 or MFP 105 in the network domain. A loop process starts from step S604 to step S606, and is repeated for a number of times corresponding to the number of the MFPs 103 and 105 searched in step S602.

In step S606, the CPU 315 of the MFP 104 performs peer-to-peer communication with the MFP 103 or MFP 105 namely a destination where the data is copied to be shared. The data newly added to the MFP 104 is copied to be shared by with the MFP 103 or MFP 105. When copying and sharing of the data is completed with the both MFPs 103 and 105 in the network domain, the process ends.

Figure 7:
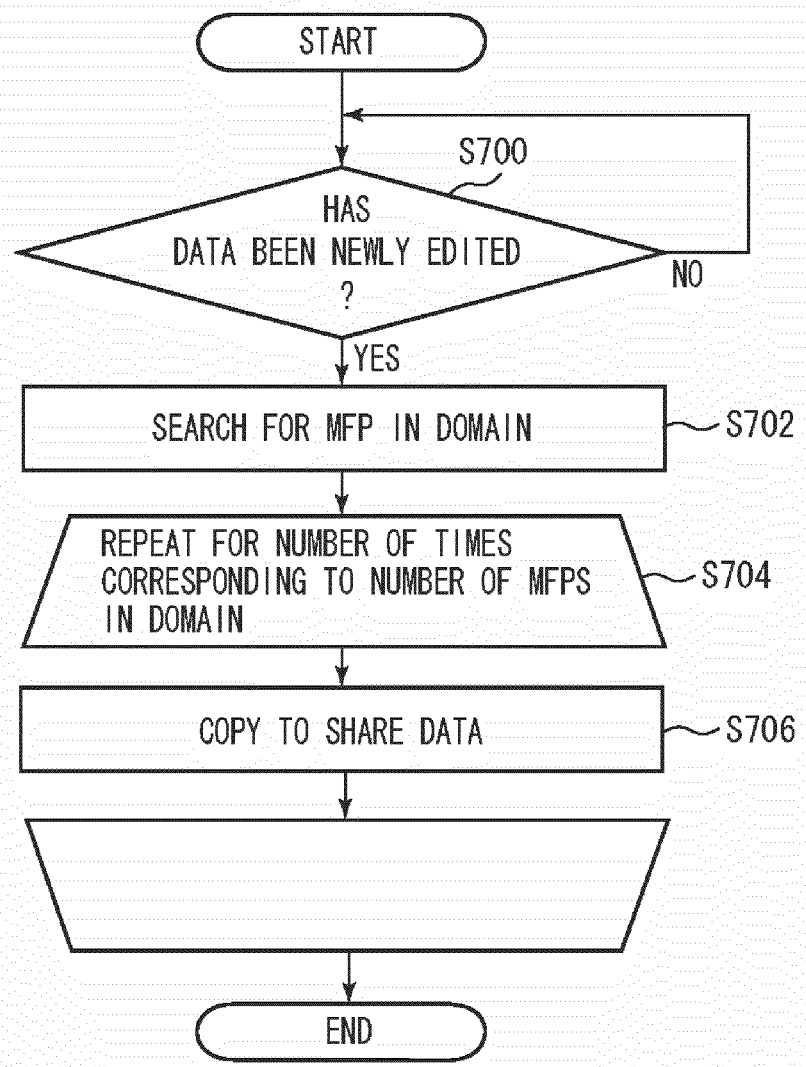
FIG. 7 is a flowchart illustrating a process for copying to share updated data among a plurality of MFPs when data stored in an MFP is updated.

Next, a process for copying and sharing updated data that is shared among the MFPs 103, 104 and 105 in the office system 100 when the data stored in the MFP 104 is updated will be described with reference to FIG. 7. It is assumed that, as illustrated in FIG. 4, the data of the MFP 104 is updated and is copied to be shared with the MFPs 105 and 103 in the office system 100. The process is executed and realized by the CPU 315 of the MFPs 103, 104 and 105. In the following descriptions, the MFP 104 is to execute processing illustrated in the flowchart of FIG. 7.

In step S700, the CPU 315 of the MFP 104 waits until the user edits data. If the user edits the data (YES in step S700), the process proceeds to step S702. In step S702, the CPU 315 of the MFP 104 searches for the MFP 103 or MFP 105 in the network domain. A loop process starts from step S704 to step S706, and is repeated for a number of times corresponding to the number of the MFPs 103 and 105 searched in step S702.

In step S706, the CPU 315 of the MFP 104 performs peer-to-peer communication with the MFP 103 or MFP 105 in which data is copied to be shared. The updated data is copied so as to be shared with the MFP 103 or MFP 105. When copying and sharing of the data is completed with the both MFPs 103 and 105 in the network domain, the process ends.

Figure 8:
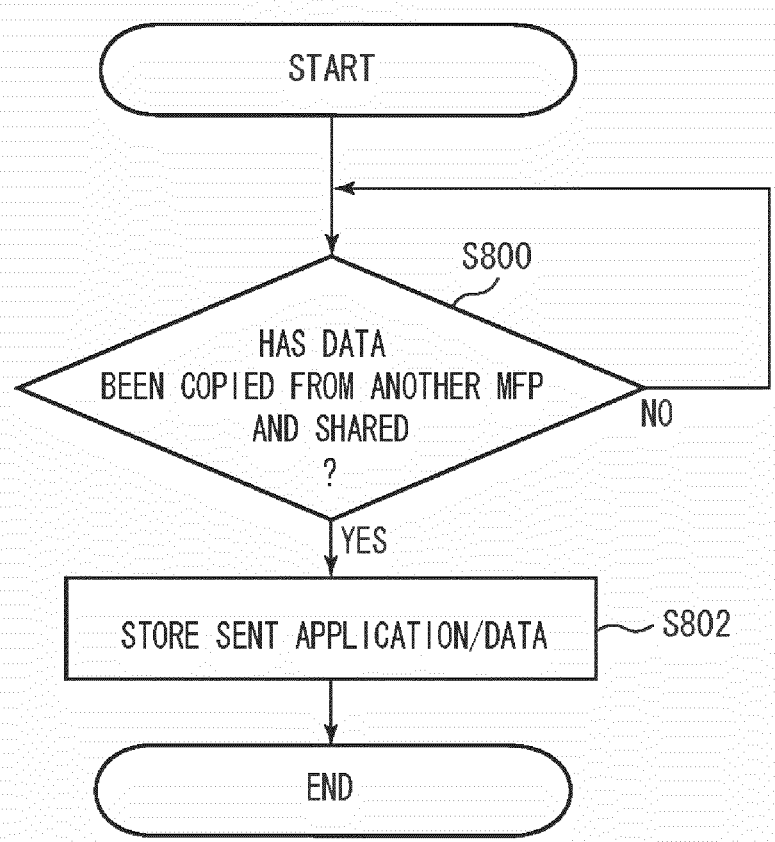
FIG. 8 is a flowchart illustrating a process to be executed when an MFP receives an application or data sent in a form of a shared copy from another MFP.

Next, a process for receiving the shared copy of the application or data that is sent from the MFP 104 will be described with reference to FIG. 8. It is assumed that the MFP 105 is to receive the data or application which is sent from the MFP 104 using the shared copy function. The process is executed and realized by the CPU 315 of the MFP 105.

In step S800, the CPU 315 of the MFP 105 waits until a shared copy of the data is generated by the MFP 104 in the network domain. If data is copied and shared (YES in step S800), the process proceeds to step S802. In step S802, the CPU 315 of the MFP 105 stores the application, license information and data, which have been sent from the MFP 104, in the storage device 313 in association with an IP address of the MFP 104 i.e. a transmission source.

A process to be executed when the license information has been sent will be described. Normally, the user purchases a necessary number of applications. However, if the copy of the application and the license information are shared among the all MFPs 103, 104 and 105 in the office system 100, it may violate the license agreement.

In the present embodiment, to avoid such violation, the shared copy of the application and license information are made unavailable. In addition, the shared copy of the application and license information can be available only when the MFP including the application and the license is not available and the other MFP performs an alternative operation. The alternative operation will be described in detail below.

A process for selecting the application or data that is copied to be shared will be described with reference to FIGS. 9 and 10. The process is executed at arbitrary timing in response to a user instruction as described in FIG. 2. If the entire applications and the entire data are shared, the capacity of the storage device 313 of the MFP becomes tight. Thus, information to be copied and shared can be selected. The process is executed and realized by the CPU 315 of each of the MFPs 103, 104 and 105.

In step S1000, the CPU 315 of the MFP waits until the user uses a selection function. If the user uses the selection function (YES in step S1000), the process proceeds to step S1002. In step S1002, the CPU 315 of the MFP reads the selection information stored in the storage device 313. If the selection information is not stored in the storage device 313, it is assumed that nothing has been selected.

Figure 9:
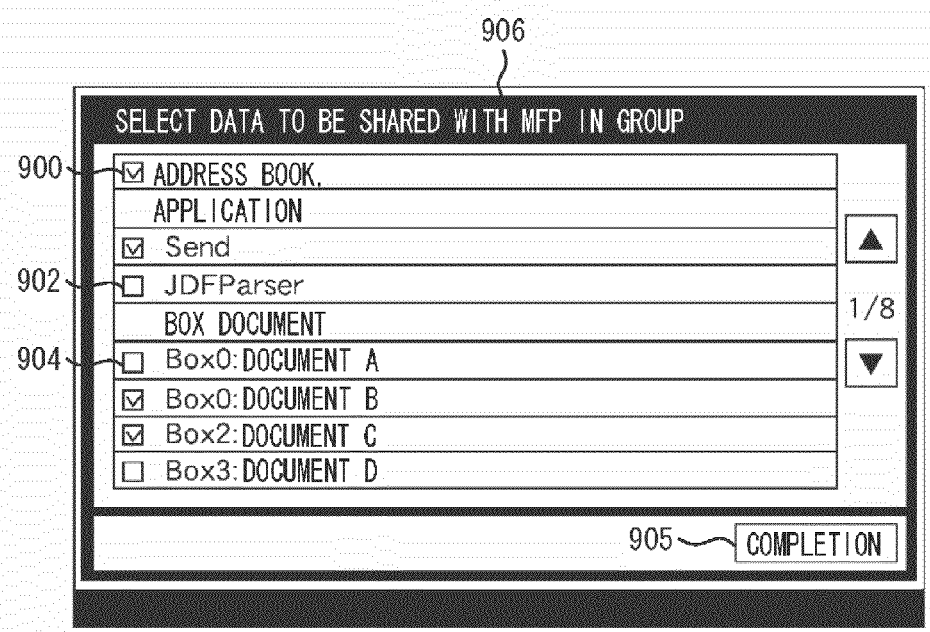
FIG. 9 illustrates an example of a shared copy data selection screen.
Figure 10:
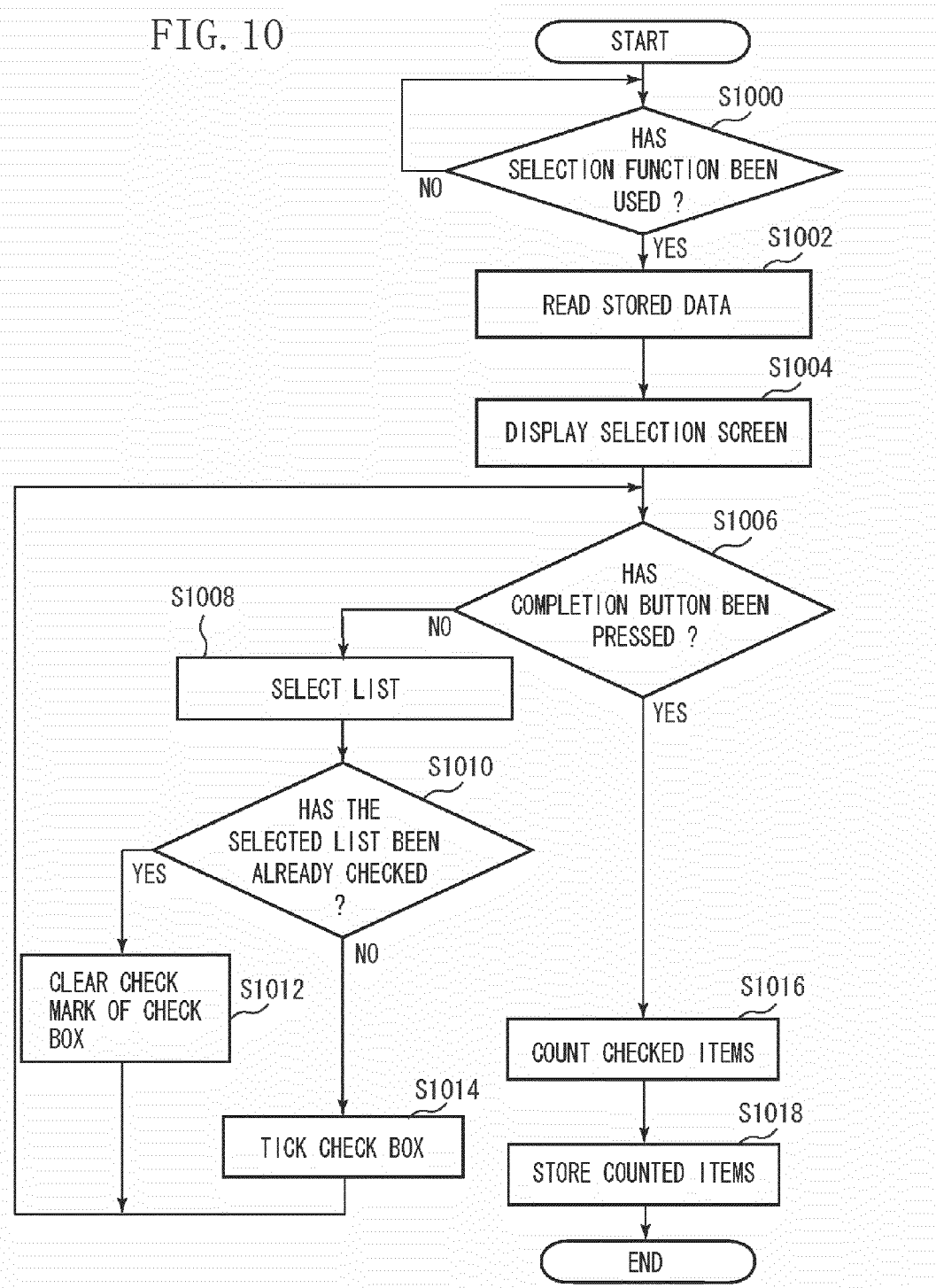
FIG. 10 is a flowchart illustrating a process for selecting an application or data to be copied and shared.

In step S1004, the CPU 315 of the MFP displays a shared copy data selection screen 906 illustrated in FIG. 9 on the operation unit 306 based on the selection information of step S1002. The shared copy data selection screen 906 displays the applications and data installed in the MFPs 103, 104 and 105 in a form of a list. The list includes check boxes 900 to 904. By ticking any of the check boxes, a selected state and a non-selected state can be switched. A piece of the selection information of step S1002 has already been ticked in its corresponding check box.

In step S1006, the CPU 315 of the MFP waits until the user presses a completion button 905 of the shard copy data selection screen 906. When the completion button 905 is not pressed in step S1006 (NO in step S1006), the process proceeds to step S1008. In step S1008, the CPU 315 of the MFP receives selection of a predetermined item in the list. In step S1010, the CPU 315 of the MFP determines whether the selected item of the list has already been checked. If the selected item of the list has already been checked (YES in step S1010), the process proceeds to step S1012 and the check mark of the check box is cleared. If the selected item of the list has not already been checked (NO in step S1010), the process proceeds to step S1014, and the check box is ticked.

Step S1008 to step S1014 are repeated until the user presses the completion button 905. If the user presses the completion button 905 (YES in step S1006), the process proceeds to step S1016 and the CPU 315 of the MFP counts the checked items of the list. In step S1018, the CPU 315 of the MFP stores the counted items in the storage device 313 and ends the process.

If the application and data to be shared using the function described in the above process are selected, only the selected application and data are copied to be shared in the office system.

A process to be executed when maintenance of the MFPs 103, 104 and 105 is performed by a service engineer will be described with reference to FIG. 11. It is assumed that maintenance is performed for the MFP 104 (a first image processing apparatus, an external image processing apparatus). The process is a detailed description of the process 3002 illustrated in FIG. 30. The process is executed and realized by the CPU 315 of the MFP 104.

In step S1100, the CPU 315 of the MFP 104 waits until the maintenance of the MFP 104 is started by the service engineer. When the maintenance is started (YES in step S1100), the process proceeds to step S1102. In step S1102, the CPU 315 of the MFP 104 searches for the MFPs 103 and 105 in the network domain. A loop process starts from step S1104 to step S1106, and is repeated for a number of times corresponding to the number of MFPs 103 and 105 searched in step S1102.

In step S1106, the CPU 315 of the MFP 104 performs peer-to-peer communication with the MFP 103 or MFP 105 (a second image processing apparatus) which are notification destination. The CPU 315 notifies that the MFP 104 is not available for a long period of time due to maintenance. Upon reception of the notice, the MFP starts the alternative operation using aprocess of FIG. 14, as described below. When sending the notice is completed to both the MFPs 103 and 105 in the network domain, the process ends.

A process for notifying of a failure of the MFPs 103, 104 and 105 will be described with reference to FIG. 12. It is assumed that a failure has occurred in the MFP 104. The process is a detailed description of the process 3002 illustrated in FIG. 30. The process is executed and realized by the CPU 315 of the MFP 104. If the process cannot be executed due to the degree of the failure in the MFP, the process is not executed.

In step S1200, the CPU 315 of the MFP 104 determines whether a failure has occurred. When it is determined that the failure has occurred in the MFP 104 (YES in step S1200), the process proceeds to step S1202. In step S1202, the CPU 315 of the MFP 104 determines whether the failure can be notified. For example, when the failure occurs in the NIC unit 303 of the MFP 104, the CPU 315 determines that the failure cannot be notified (NO in step S1202), and the process proceeds to step S1210.

In step S1210, the CPU 315 of the MFP 104 controls the operation unit 306 to display a failure message and ends the process. When it is determined that the failure can be notified in step S1202 (YES in step S1202), the process proceeds to step S1204. In step S1204, the CPU 315 of the MFP 104 searches for the MFPs 103 and 105 in the network domain. A loop process starts from step S1206 to step S1208, and is repeated for a number of times corresponding to the number of the MFPs 103 and 105 searched in step S1204.

In step S1208, the CPU 315 of the MFP 104 performs peer-to-peer communication with the MFP 103 or MFP 105 which are the notification destination. The CPU 315 notifies the MFP 103 or MFP 105 that the MFP 104 is not available for a long period of time due to a failure. Upon reception of the notice, the MFP 103 or MFP 105 starts the alternative operation as illustrated in FIG. 14, as described below. When sending the notice is completed to both the MFPs 103 and 105 in the network domain, the process ends.

A process for notifying that a failure occurs each of the MFPs 103, 104 and 105 by a user operation or an operation of the service engineer (i.e. an external operation) will be described with reference to FIG. 13. It is assumed that a failure has occurred in the MFP 104. The process is a detailed description of the process 3002 of FIG. 30. The process is executed and realized by the CPU 315 of the MFP 104. If the process cannot be executed due to the degree of the failure, the process will not be executed.

In step, the CPU 315 of the MFP 104 checks whether a network function and a user interface (UI) function (a user interface function using the operation unit 306) of the MFP 104 normally operate. When it is determined that both functions do not normally operate (NO in step S1302), the process ends. When it is determined that both functions normally operate (YES in step S1302), the process proceeds to step S1304. In step S1304, the CPU 315 of the MFP 104 displays a failure message on the operation unit 306.

In step S1306, the CPU 315 waits until the user or the server engineer performs a notification operation of the failure. In step S1308, the CPU 315 of the MFP 104 detects that an IP address of any of the MFPs 103 and 105 which are the notification destination is input by the user or the service engineer via the operation unit 306. In step S1310, the CPU 315 of the MFP 104 notifies the MFP 103 or 105 which is specified by the input IP address of the failure.

A process that one of the MFPs 103, 104 and 105 performs a polling operation to detect the failure of the other MFP will be described. It is assumed that a failure has occurred in the MFP 104, and the MFP 105 performs the polling operation at predetermined intervals. The process is executed and realized by the CPU 315 of the MFP 105. The process is executed to detect the failure of the MFP 104 by the normally operated MFP 105 performing the polling operation when the MFP 104 cannot send notice in the flowcharts illustrated in FIGS. 12 and 13 due to its failure.

In step S1400, the CPU 315 of the MFP 105 waits until a previously set time period elapses. In step S1402, the CPU 315 of the MFP 105 searches for the MFPs 103 and 104 in the network domain. A loop process starts from step S1404 to step S1408, and is repeated for a number of times corresponding to the number of the MFPs 103 and 104 searched in step S1402.

In step S1406, the CPU 315 of the MFP 105 sends a packet for confirming a normal operation of the MFP 103 or MFP 104 thereto. In step S1408, the CPU 315 of the MFP 105 determines whether the MFP 103 or MFP 104 normally operates (whether the MFP is available) based on return of the packet for confirming the normal operation that has been sent in step S1406.

when it is determined that the MFP 103 or MFP 104 normally operates (YES in step S1408) a next loop process is preformed. When it is determined that a failure has occurred in the MFP 103 or MFP 104 (NO in step S1408), the process proceeds to a sub-routine in step S1410. The process of sub-routine in step S1410 will be described in detail below with reference to FIG. 23. Upon completion of an operation confirmation process of the both MFPs 103 and 104 in the network domain, the process ends.

Figure 15:
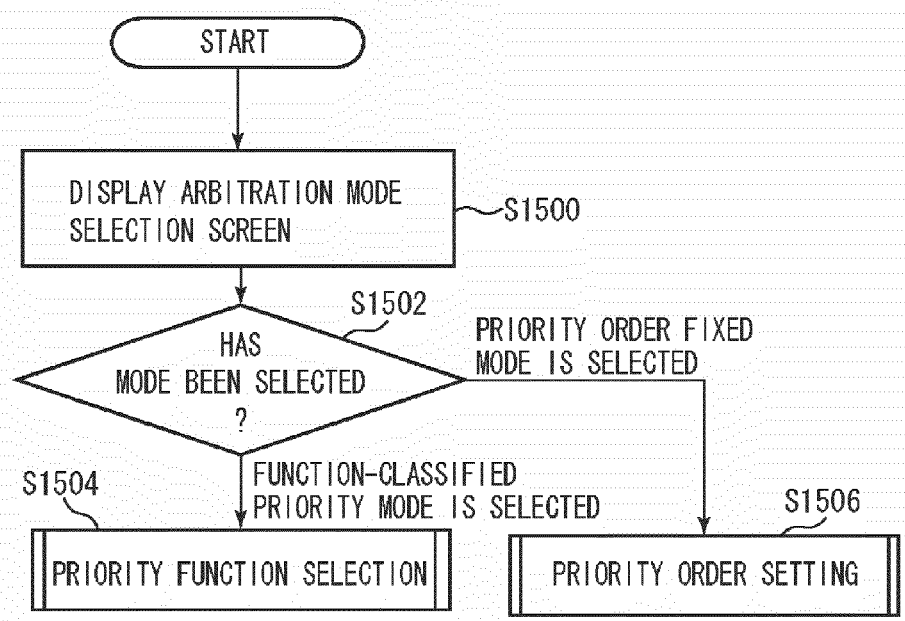
FIG. 15 is a flowchart illustrating a process for selecting an arbitration mode when an MFP performs an alternative operation.

A process for determining an arbitration rule when the MFP performs the alternative operation will be described with reference to FIG. 15. It is assumed that the MFP 104 is operated to select the arbitration mode. The process is executed at an arbitrary timing in response to the user instruction as described in FIG. 2. The process is executed and realized by the CPU 315 of the MFP 104.

In step S1500, the CPU 315 of the MFP 104 controls the operation unit 306 to display an arbitration mode selection screen 2904 illustrated in FIG. 29. In step S1502, the CPU 315 of the MFP 104 waits until the user selects the priority order setting button 2900 or the priority function selection button 2902 displayed on the arbitration mode selection screen.

When the priority order setting button 2900 is pressed (a priority order fixed mode in step S1502), the process proceeds to a sub-routine in step S1506. The sub-routine in step S1506 will be described in detail with reference to FIG. 16. When the priority function selection button 2902 is pressed (a function-classified priority mode in step S1502), the process proceeds to a sub-routine in step S1504. The sub-routine in step S1504 will be described in detail with reference to FIG. 17.

The detail process of the sub-routine in step S1506 of FIG. 15 will be described with reference to FIG. 16. The process is executed and realized by the CPU 315 of the MFP 104.

In step S1600, the CPU 315 of the MFP 104 searches for the MFPs 103 and 105 in the network domain. In step S1602, the CPU 315 of the MFP 104 displays a priority order setting screen 1806 illustrated in FIG. 18 on the operation unit 306. The priority order setting screen 1806 includes a list 1800 of the MFPs 103 and 105 searched in step S1600. In step S1604, the CPU 315 of the MFP 104 displays the MFPs on a selection result column 1802 in an order of user-input priorities.

Figure 20:
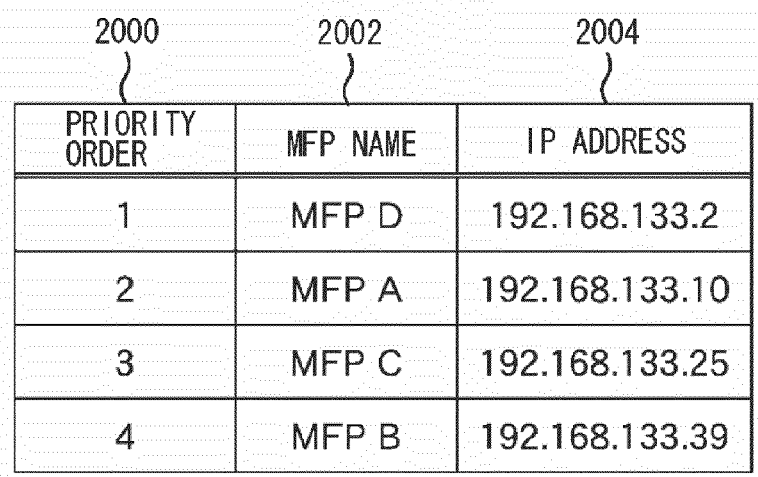
FIG. 20 illustrates an example of priority order data.
Figure 21:
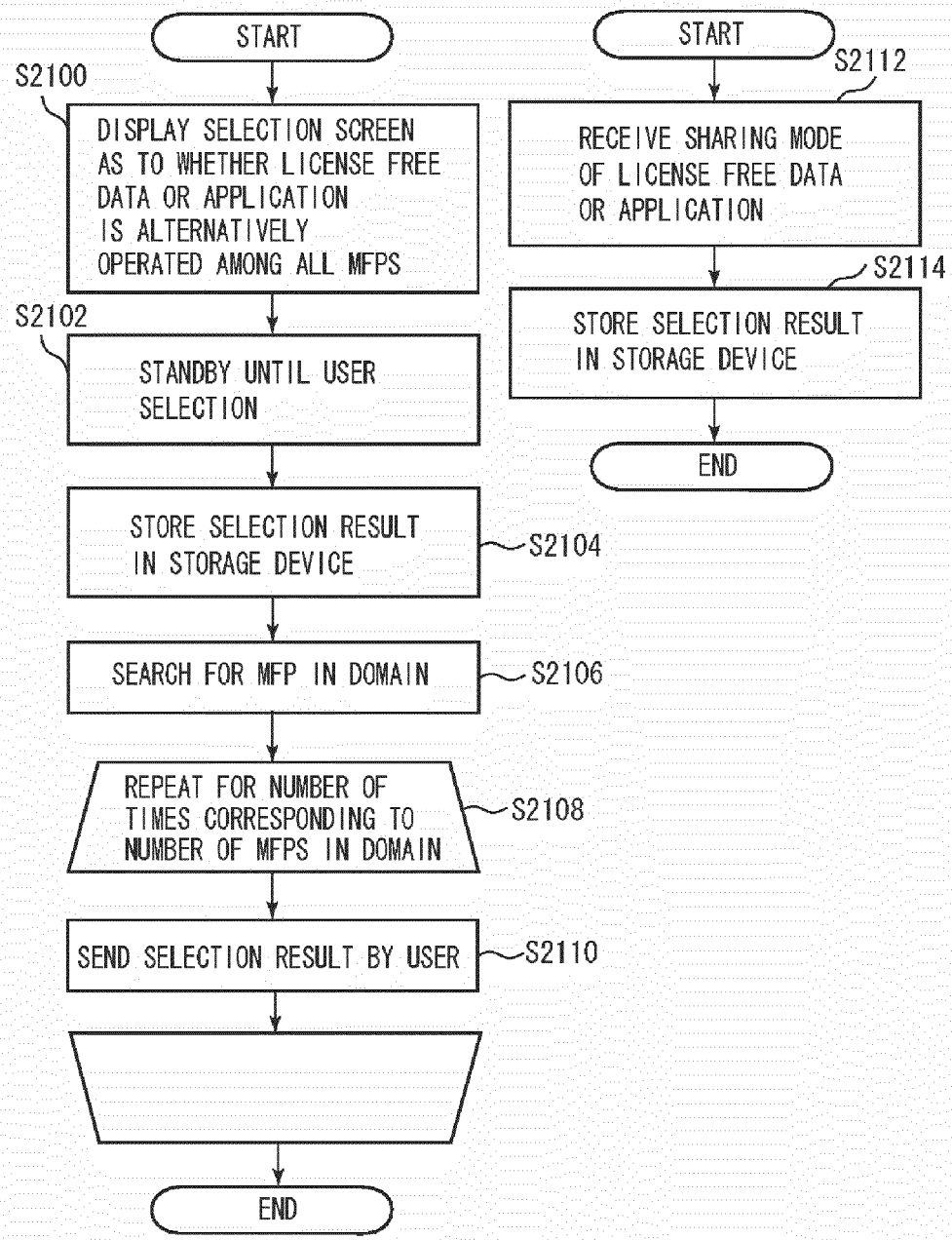
FIG. 21A and FIG. 21B are flowcharts each illustrating a process for selecting whether to alternatively operate license free data or application in all MFPs.

If a completion button 1804 on the priority order setting screen 1806 is pressed, the CPU 315 of the MFP 104 stores the priority order list in the storage device 313 in a format illustrated in FIG. 20. The priority order list includes items 2000, 2002 and 2004 as one record, and is stored in a list configuration in association with the number of MFPs.

A loop process starts from step S1606 to step S1608, and is repeated for a number of times corresponding to the number of the MFPs searched in step S1600. In step S1608, the CPU 315 of the MFP 104 sends the priority order list stored in step S1604, to the other MFP. Thus, the priority order list is shared among the all MFPs 103, 104 and 105 in the network domain.

Figure 17:
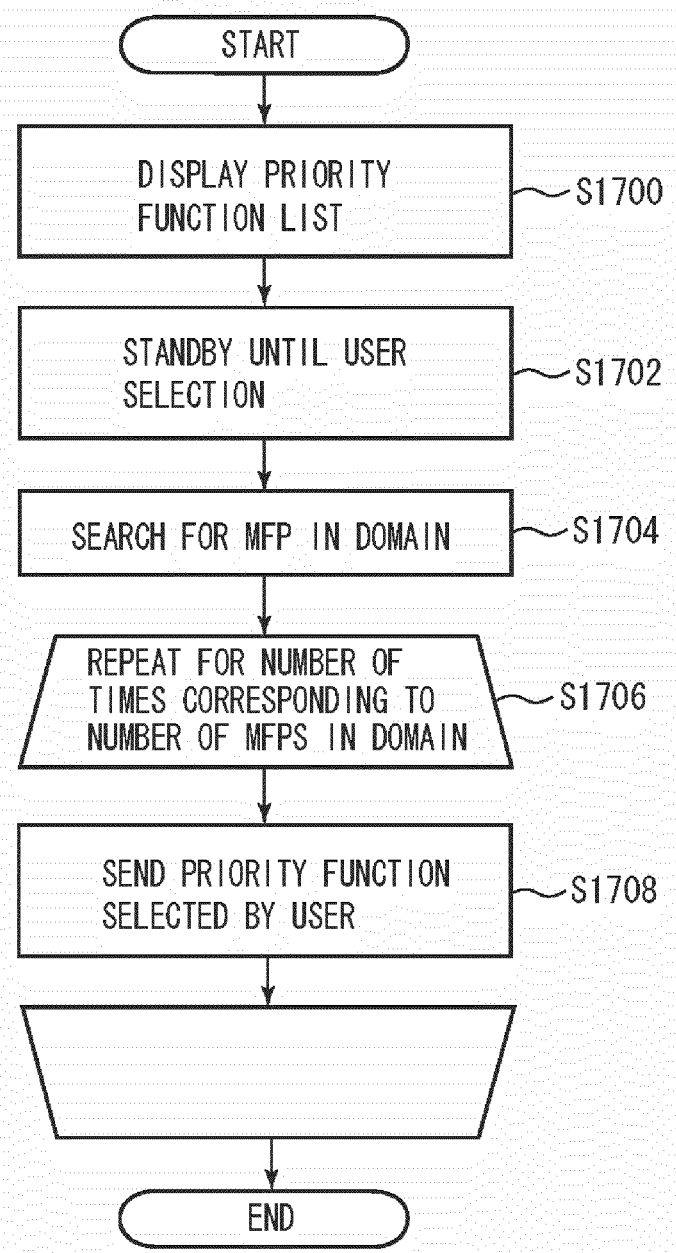
FIG. 17 is a flowchart illustrating details of a priority function selection process of FIG. 15.

The detail process of the sub-routine in step S1504 of FIG. 15 will be described with reference to FIG. 17. The process is executed and realized by the CPU 315 of the MFP 104.

Figure 19:
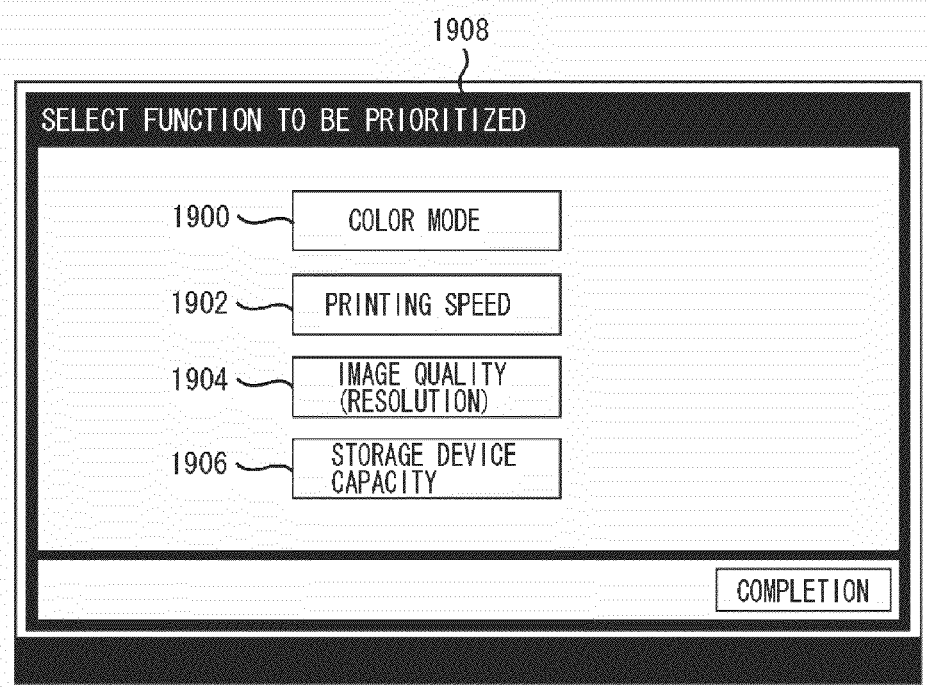
FIG. 19 illustrates an example of a priority function selection screen.

In step S1700, the CPU 315 of the MFP 104 displays a priority function selection screen 1908 illustrated in FIG. 19 on the operation unit 306. In this example, four different functions are given as criteria for selecting an MFP with a high capability. These functions include a color mode 1900, a printing speed 1902 (capability of color printing), image quality (resolution) 1904, and storage device capacity 1906. However, it is not limited to these four functions. Any other functions equipped in the MFPs 103, 104, and 105 may be applied.

In step S1702, the CPU 315 of the MFP 104 waits until the user selects the priority function. Upon pressing of any one of buttons 1900 to 1906 in the priority function selection screen 1908, the CPU 315 stores a selection result in the storage device 313.

In step S1704, the CPU 315 of the MFP 104 searches for the MFPs in the network domain. A loop process starts from step S1706 to step S1708, and is repeated for a number of times corresponding to the number of the MFPs searched in step S1704. In step S1708, the CPU 315 of the MFP 104 sends the selection result stored in step S1702 to the other MFP. Thus, the selection result is shared among the all MFPs 103, 104 and 105 in the network domain.

A process for selecting whether to perform the alternative operation for license free application and data among the all MFPs 103, 104 and 105 will be described with reference to FIGS. 21A and 21B. It is assumed that the MFP 104 is operated to perform selection. The process is executed at an arbitrary timing in response to the user instruction as described in FIG. 2. The process is executed and realized by the CPU 315 of the MFP 104.

Figure 22:
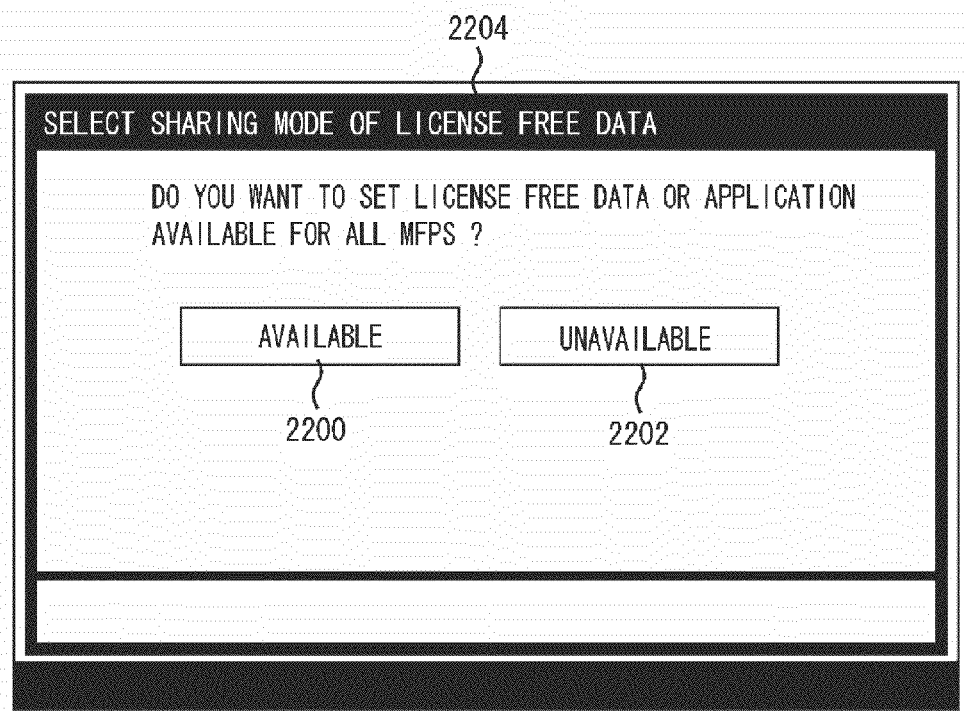
FIG. 22 illustrates an example of a sharing mode selection screen.

In step S2100, the CPU 315 of the MFP 104 displays a sharing mode selection screen 2204 illustrated in FIG. 22 on the operation unit 306 to inquire the user whether the license free data or application is made available among the all MFPs. In step S2102, the CPU 315 of the MFP 104 waits until the user presses an available button 2200 or an unavailable button 2202.

In step S2104, the CPU 315 of the MFP 104 stores a selection result of step S2102 in the storage device 313. In step S2106, the CPU 315 of the MFP 104 searches for the MFP in the network domain. A loop process starts from step S2108 to step S2110, and is repeated for a number of times corresponding to the number of the MFPs searched in step S2106.

In step S2110, the CPU 315 of the MFP 104 sends the selection result stored in step S2104 to the other MFP. Thus, the selection result is shared among the all MFPs in the network domain.

A process including step S2112 to step S2114 is performed when the selection result as to whether the alternative operation for the license free application or data is performed among the all MFPs is received from the other MFP. Upon reception of the selection result from the other MFP in step S2112, in step 2114, the CPU 315 of the MFP 104 stores the selection result in the storage device 313.

Figure 23:
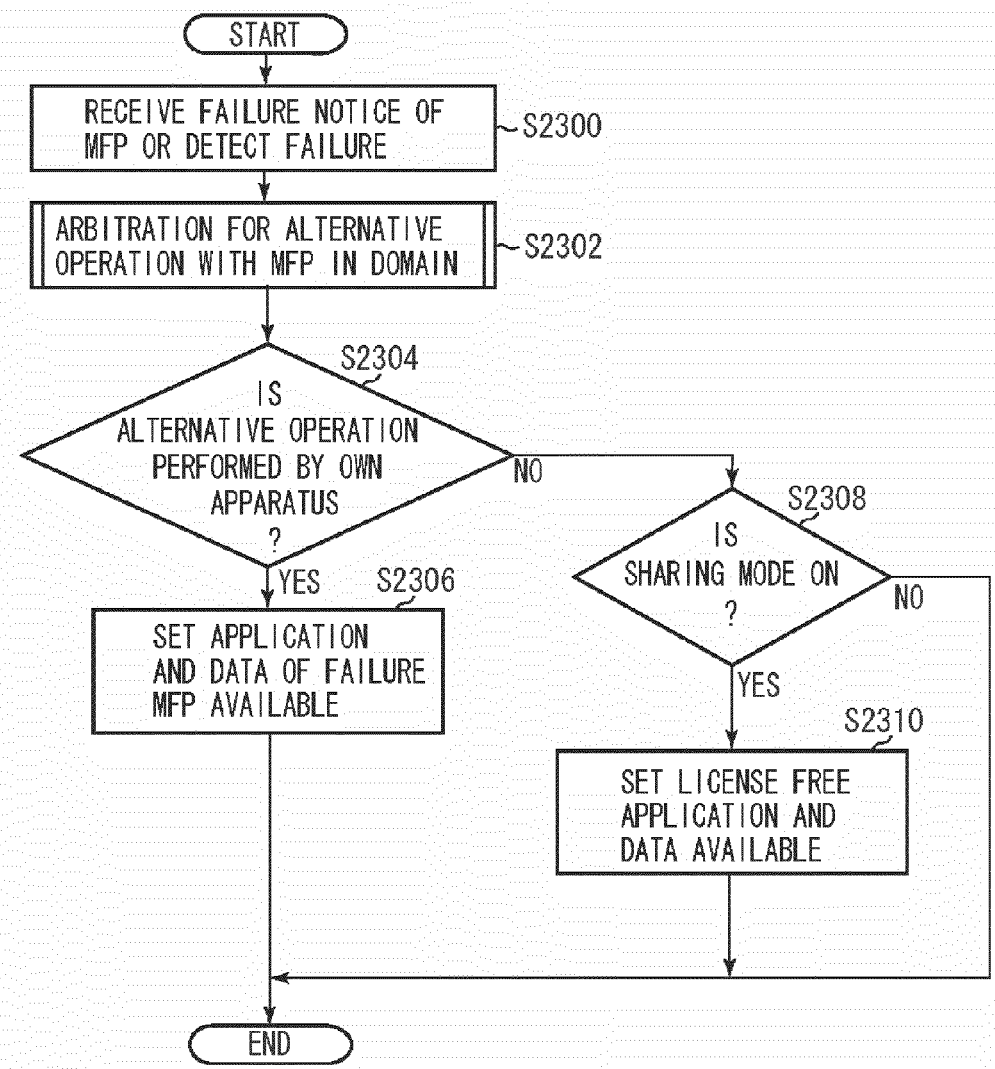
FIG. 23 is a flowchart illustrating a process for selecting whether to perform an alternative operation when an MFP is not available due to a failure or maintenance.

A process for selecting whether to perform the alternative operation when the other MFP is not available due to a failure or maintenance will be described with reference to FIG. 23. It is assumed that a failure has occurred in the MFP 104, and the MFP 105 alternatively operates. The process is a detailed description of each of the process 3006, process 3008 and process 3010 in FIG. 30. The process is executed and realized by the CPU 315 of the MFP 105.

Figure 11:
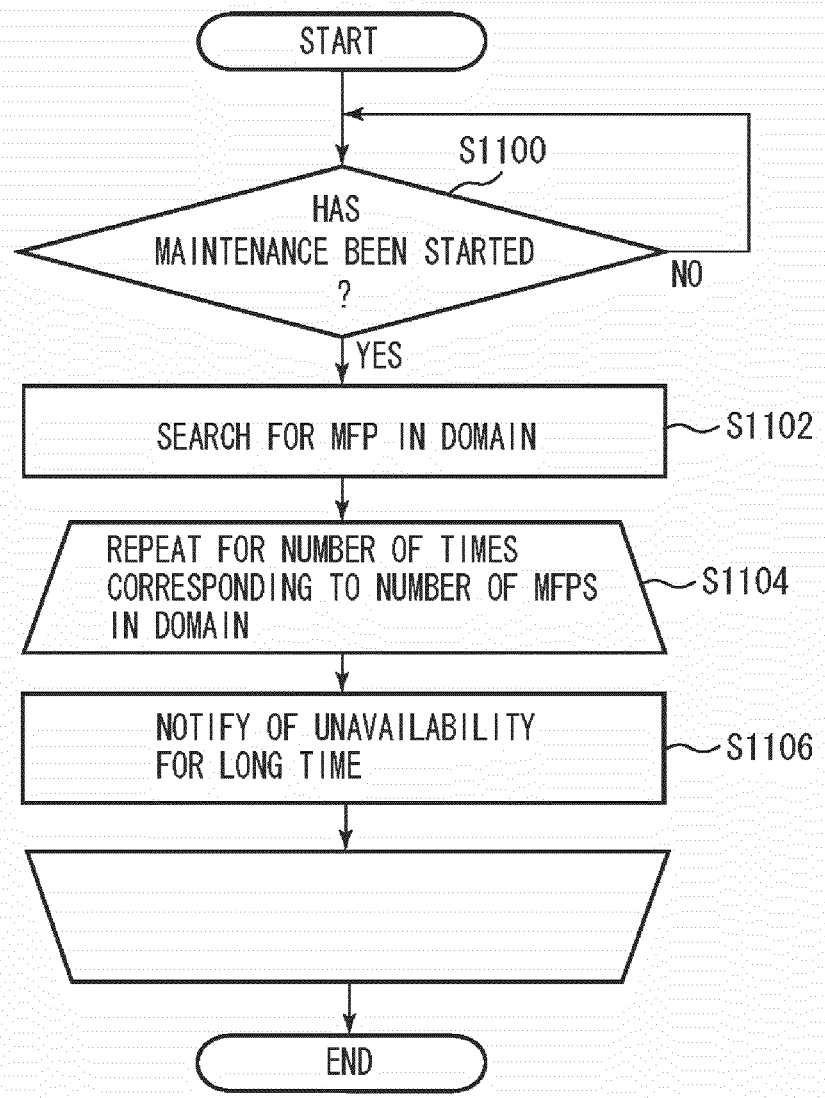
FIG. 11 is a flowchart illustrating a process for notifying that an MFP is not available for a long period of time due to maintenance.
Figure 12:
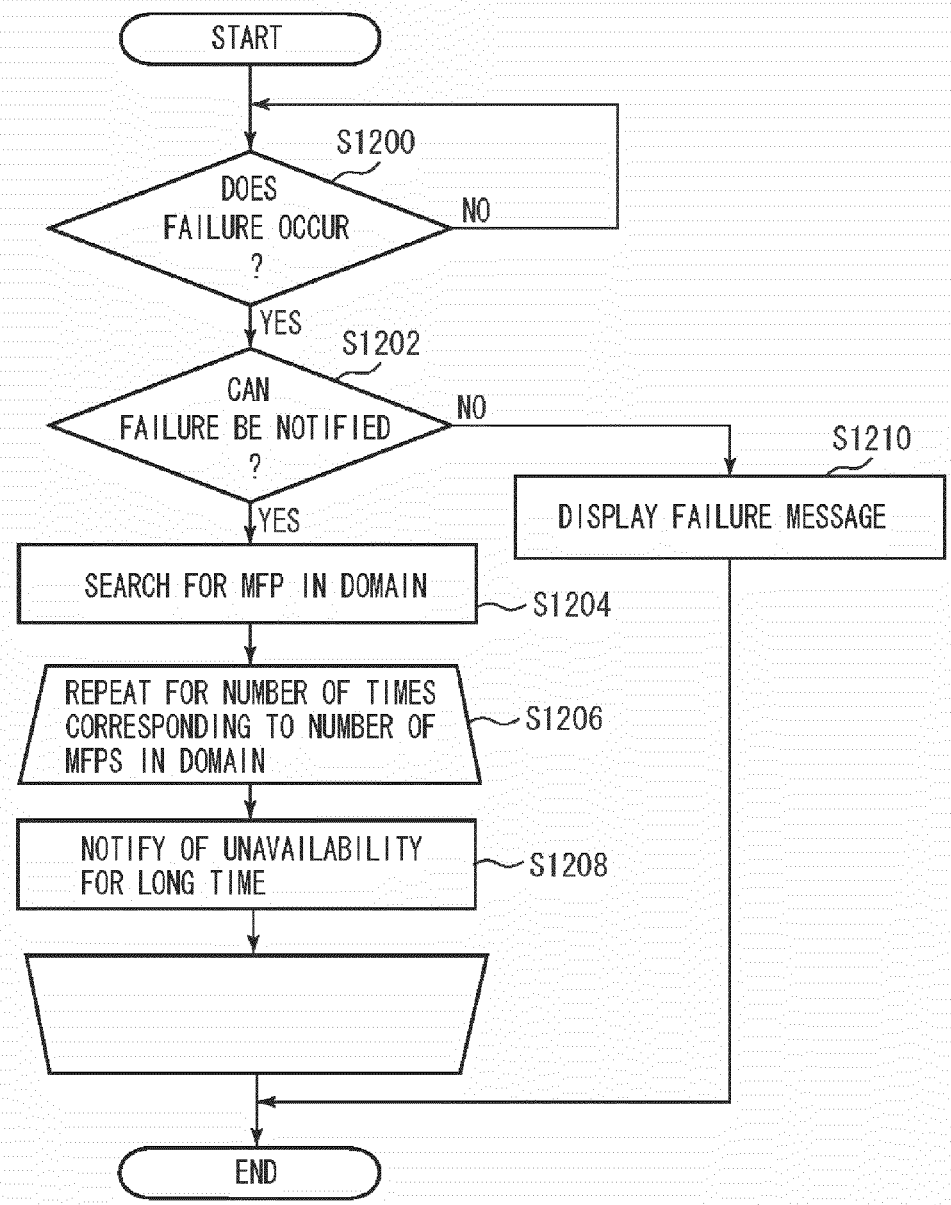
FIG. 12 is a flowchart illustrating a process for notifying that an MFP is not available for a long period of time due to a failure.
Figure 13:
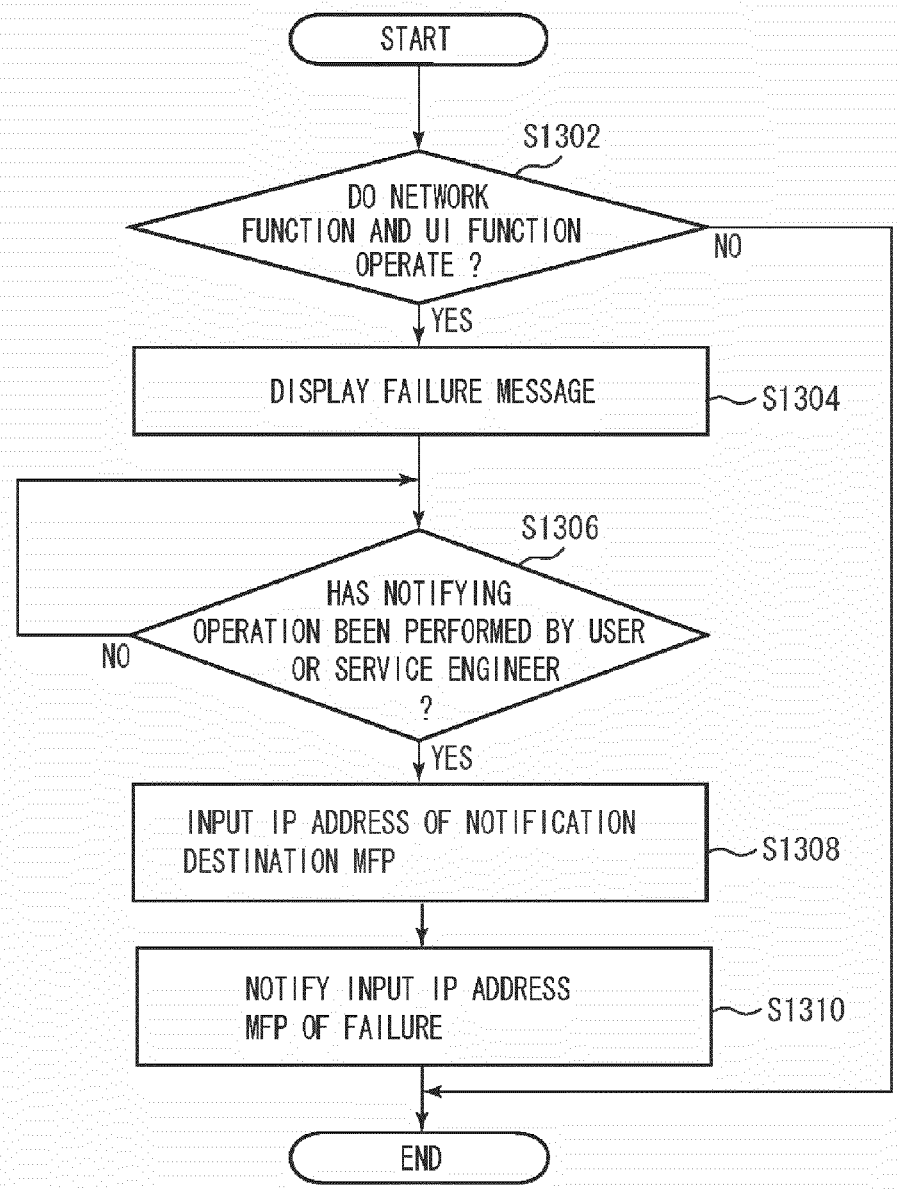
FIG. 13 is a flowchart illustrating a process for notifying that a failure is caused by a user operation or service engineer operation when the failure occurs in the MFP.
Figure 14:
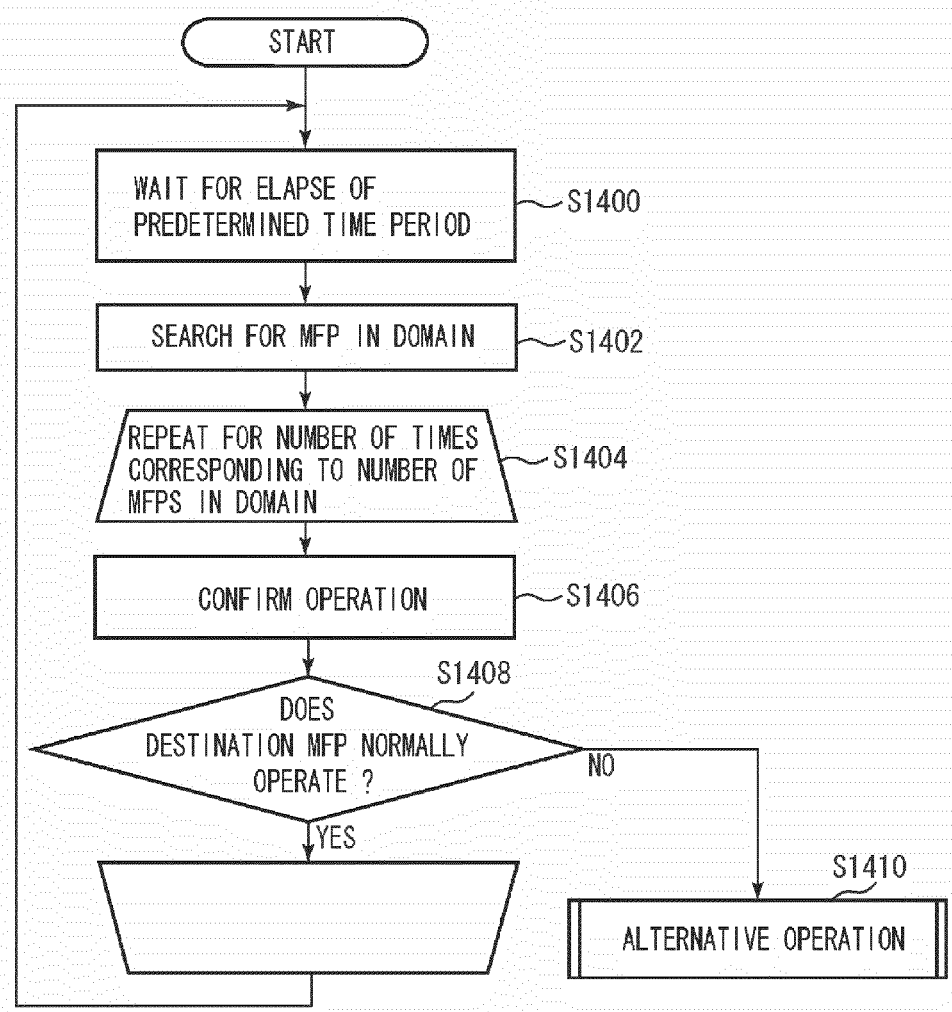
FIG. 14 is a flowchart illustrating a process for detecting a failure of another MFP by performing a polling operation in an MFP.

In step S2300, the CPU 315 of the MFP 105 receives failure notice from the other MFP as illustrated in FIGS. 11 to 13, or detects that the other MFP does not operate by performing the polling operation as illustrated in FIG. 14. The polling operation has already been described in FIG. 14. The process is also a detailed description of the sub-routine in step S1410 of FIG. 14.

In a sub-routine in step S2302, the CPU 315 of the MFP 105 arbitrates the alternative operation with the MFP 103 in the network domain. More specifically, if the alternative operation for a fare-paying application requiring a license is performed between the plurality of MFPs 103 and 105, it violates the license agreement. Thus, the CPU 315 arbitrates the alternative operation to be performed by only one MFP in the network domain. The detail description of the sub-routine in step S2302 will be described in detail below with reference to FIG. 24.

In step S2304, the CPU 315 of the MFP 105 determines whether the MFP 105 performs the alternative operation by own apparatus based on a result of arbitration in the sub-routine in step S2302. When it is determined that the MFP 105 (the corresponding MFP) performs the alternative operation by own apparatus (YES in step S2304), the process proceeds to step S2306. In step S2306, the CPU 315 of the MFP 105 performs the alternative operation using the application, license information and data which are copied and shared to the storage device 313 in step S802 of FIG. 8.

At this time, the storage device 313 of the MFP 105 stores the information that is copied and shared from the plurality of MFPs 103 and 104. Since the information is copied and shared in step S802 of FIG. 8 by associating with IP address, the information can be selected by the IP address as an identifier.

When it is determined that the own apparatus does not perform the alternative operation (NO in step S2304), the process proceeds to step S2308. In step S2308, the CPU 315 of the MFP 105 reads a selection result as to whether the alternative operation for the license free application or data is performed as described in FIGS. 21A, 21B, and 22 from the storage device 313. If no license is required, the alternative operation can be performed by the plurality of MFPs 103 and 105. When it is determined that the sharing mode turns ON in step S2308 (YES in step S2308), the process proceeds to step S2310. In step S2310, the alternative operation starts for the license free application and data.

The detail process of sub-routine in step 2302 will be described with reference to FIG. 24. It is assumed that a failure has occurred in the MFP 104, and the MFP 105 alternatively operates. The process is a detailed description of each of the process 3006, process 3008 and process 3010 in FIG. 30. The process is executed and realized by the CPU 315 of the MFP 105.

In step S2400 and step S2402, the CPU 315 of the MFP 105 confirms the arbitration mode and determines whether a priority mode is selected. The determination of the priority mode is to determine which mode either the priority order fixed mode or the function-classified priority mode is selected. The priority order fixed mode and the function-classified mode are described in FIG. 15 to FIG. 20.

Figure 16:
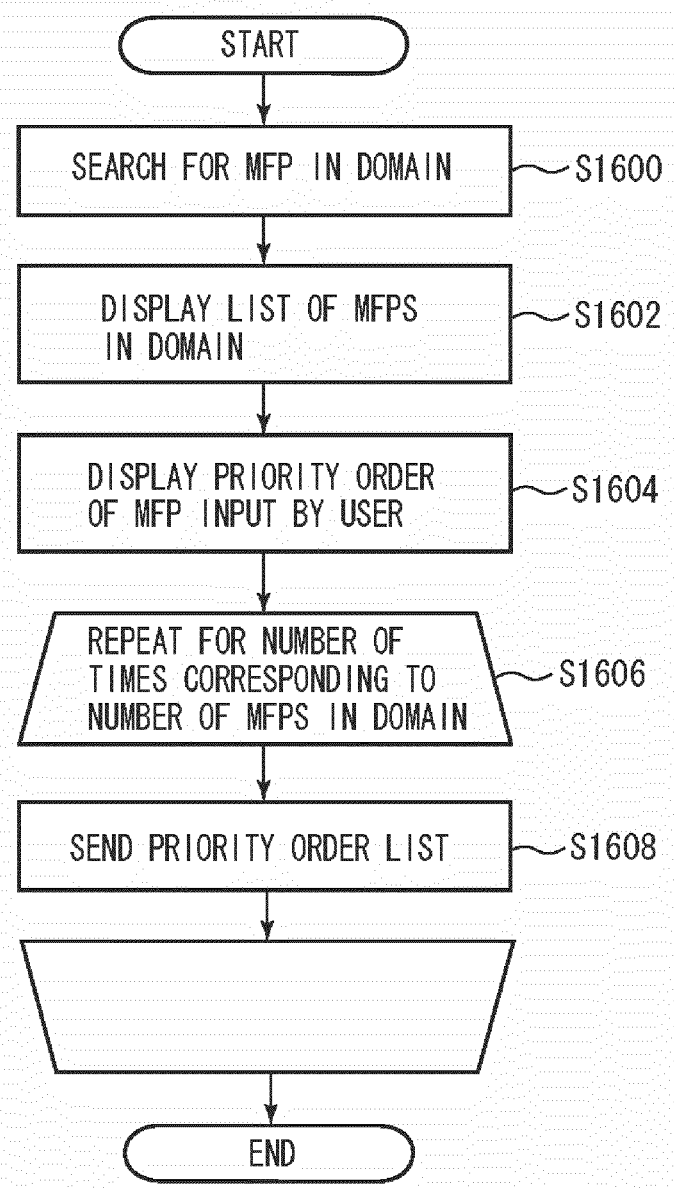
FIG. 16 is a flowchart illustrating details of a priority order setting process of FIG. 15.
Figure 18:
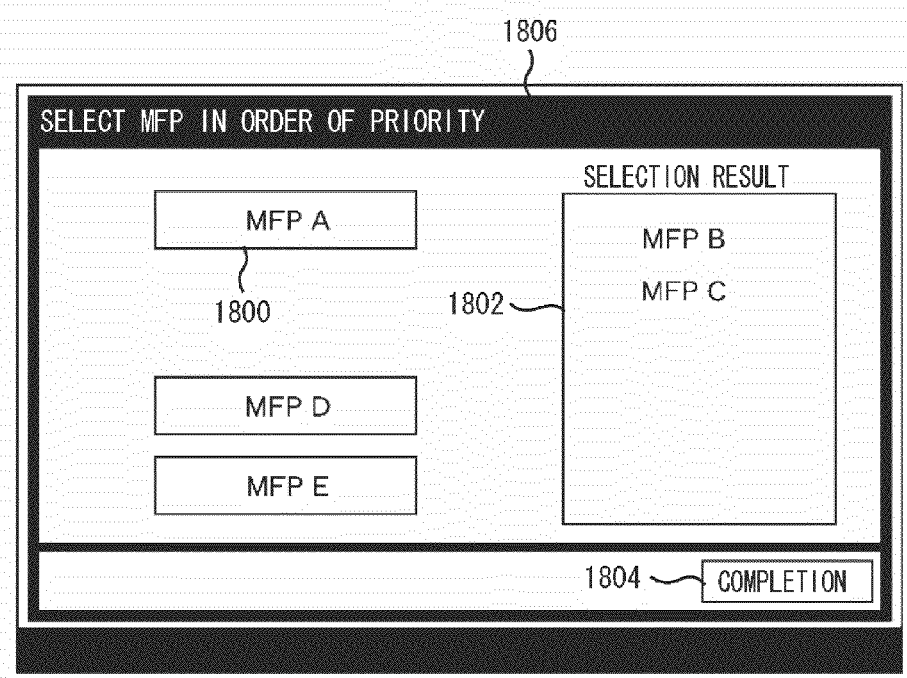
FIG. 18 illustrates an example of a priority order setting screen.

In the priority order fixed mode, the priority of each of the MFPs is fixed in the office system as described in FIGS. 16, 18, and 20. Further, the MFP with higher priority among MFPs 103, 104 and 105 performs the alternative operation.

The priority order fixed mode is set, when the priority order setting button 2900 is pressed in the operation screen 2904 in FIG. 29 and the priority order of the MFPs is set. In the function-classified priority mode, the alternative operation is performed by the MFP having the highest capability in the office system with respect to the function selected by the user as described in FIGS. 17 and 19. The function-classified priority mode is set when the priority function selection button 2902 is pressed in the operation screen 2904 of FIG. 29 and the priority function is selected. The storage device 313 stores a selection result of the priority order fixed mode/function-classified priority mode.

In step S2402, when it is determined that the priority order fixed mode is selected (YES in step S2402), the process proceeds to step S2404. In step S2404, the CPU 315 of the MFP 105 confirms the priority order list (FIG. 20). In step S2406, the CPU 315 of the MFP 105 selects an MFP in a higher rank than own apparatus in the priority order list (FIG. 20) and sends a packet for confirming a normal operation to the selected MFP.

In step S2408, the CPU 315 of the MFP 105 determines whether there is the MFP having the higher priority than own apparatus and being in the normal operation based on the selection result of step S2406. When it is determined that there is the MFP having the higher priority than own apparatus (YES in step S2408), the process proceeds to step S2410. Then, the CPU 315 of the MFP 105 ends the process without performing the alternative operation. When it is determined that there is no MFP having the higher priority than the MFP 105 (NO in step S2408), the process proceeds to step S2418 and the MFP 105 starts the alternative operation.

When it is determined that the function-classified priority mode is selected in step S2402 (NO in step S2402), the process proceeds to step S2412. In step S2412, the CPU 315 of the MFP 105 confirms the priority function selected in FIGS. 17 and 19. It is assumed that the printing speed 1902 has been selected as the priority function. In sub-routine in step S2414, the CPU 315 of the MFP 105 inquires capability of the MFPs in the network domain. The detail process of the sub-routine in step S2414 will be described below with reference to FIG. 25.

In step S2416, the CPU 315 of the MFP 105 determines whether the highest capability is possessed by own apparatus based on a result of inquiry in the sub-routine in step S2414. Since the printing speed 1902 is selected as the priority function, the CPU 315 determines whether the MFP 105 has the highest printing speed in the network domain. When it is determined that the printing speed of own apparatus is not the highest in the network domain (NO in step S2416), the process proceeds to step S2410. Then, the CPU 315 of the MFP 105 ends the process without performing the alternative operation. When it is determined that own capability is the highest one among the MFPs (YES in step S2416), the process proceeds to step S2418 and the MFP 105 starts the alternative operation.

Figure 25:
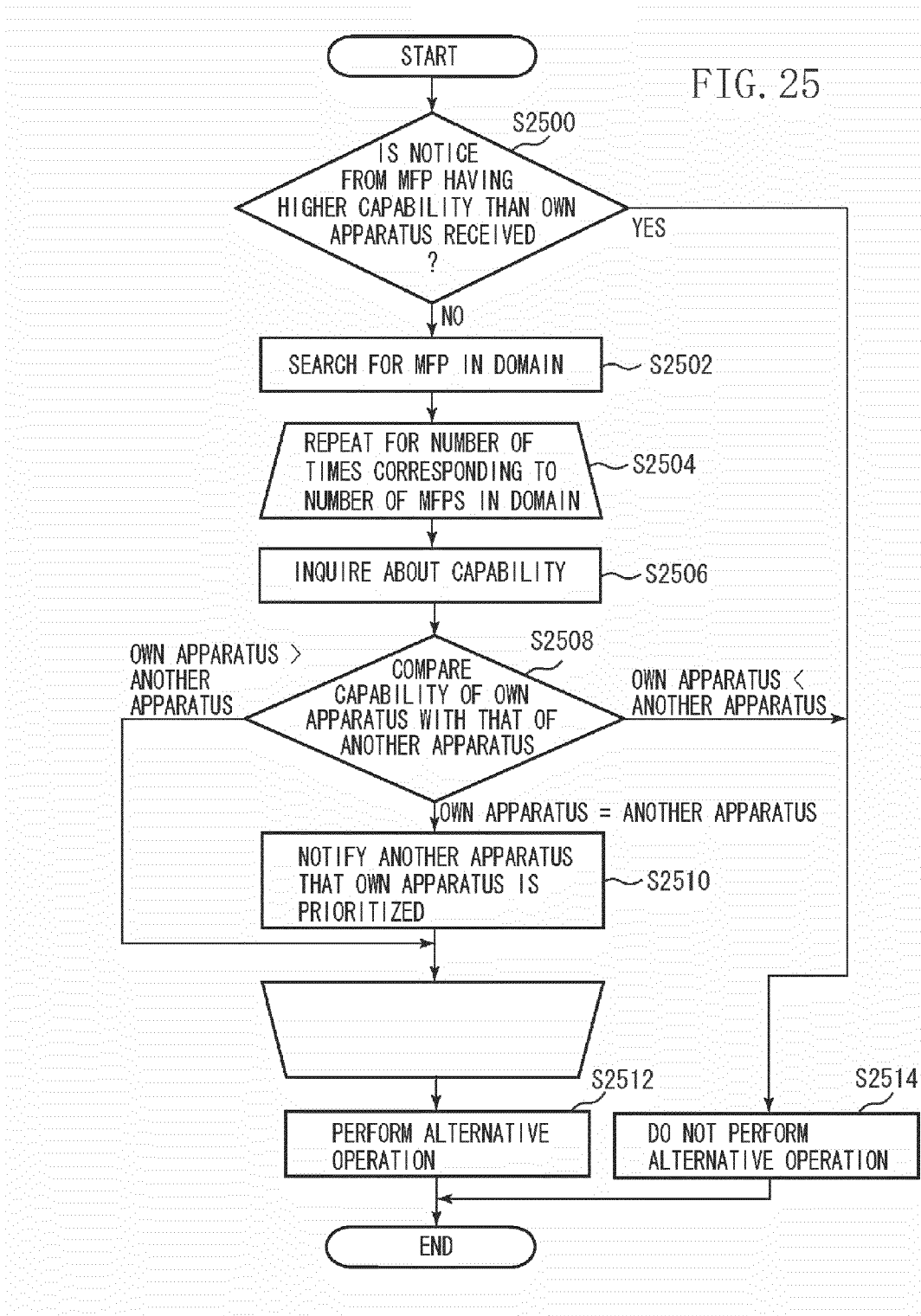
FIG. 25 is a flowchart illustrating details of a capability inquiry process of FIG. 24.

The detail process of sub-routine in step S2414 will be described with reference to FIG. 25. It is assumed that a failure has occurred in the MFP 104, and the MFP 105 performs the alternative operation. The process is a detail description of each of the process 3006, process 3008 and process 3010 of FIG. 30. The process is executed and realized by the CPU 315 of the MFP 105.

In step S2500, the CPU 315 of the MFP 105 determines whether notice has been received from an MFP having a higher capability than own apparatus. The determination is made to determine which MFP is prioritized when a plurality of MFPs have the same capability with each other. In the present embodiment, the MFP which has sent an inquiry ahead of others is prioritized.

when the MFP 105 has received an inquiry from the other MFP in advance and it is determined that notice indicating the other MFP has the same capability as that of the MFP 105 has been received in step S2500 (YES in step S2500), the process proceeds to step S2514. The notice that the other MFP has the same capability as that of the MFP 105 will be described in step S2510. In step S2514, the CPU 315 of the MFP 105 ends the process without performing the alternative operation.

When it is determined in step S2500 that no notice has been received (NO in step S2500), the process proceeds to step S2502. In step S2502, the CPU 315 of the MFP 105 searches for the MFP 103 in the network domain. A loop process starts from step S2504 to step S2510, and is repeated for a number of times corresponding to the number of MFPs 103 searched in step S2502.

Figure 24:
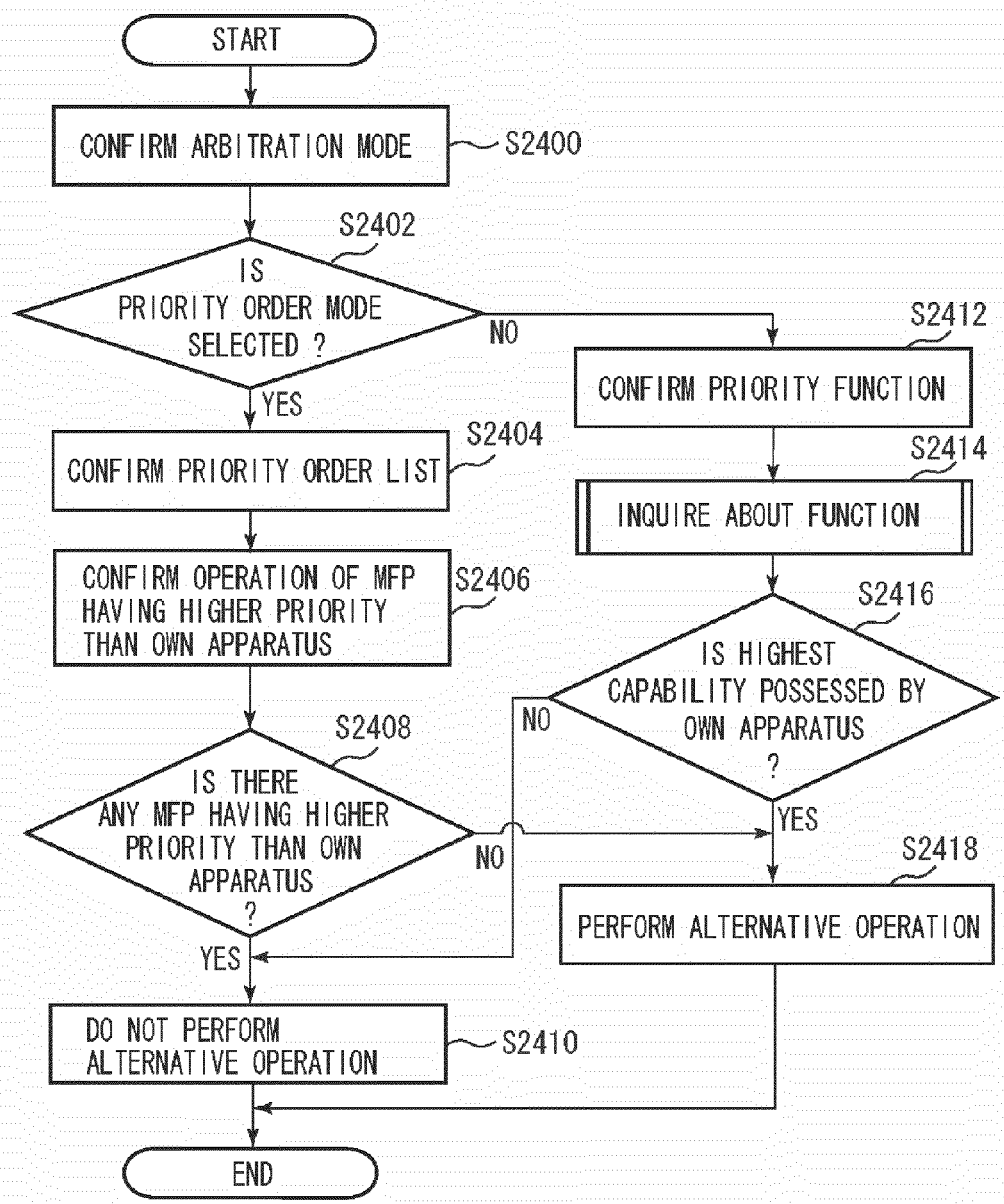
FIG. 24 is a flowchart illustrating details of an alternative operation arbitration process of FIG. 23.

In step S2506, the CPU 315 of the MFP 105 inquires of the MFP 103 about the function confirmed in step S2412 in FIG. 24. In step S2508, the CPU 315 of the MFP 105 compares the capability of own apparatus and that of the MFP 103.

When the MFP 105 has a higher capability than that of the other MFP (i.e. MFP 103) (OWN APPARATUS>ANOTHER APPARATUS in step S2508), the CPU 315 of the MFP 105 continues the loop process and inquires of the next MFP about the capability. When the capability of the other MFP is higher than that of the MFP 105 (OWN APPARATUS<ANOTHER APPARATUS in step S2508), the process exits from the loop process and proceeds to step S2514. In step S2514, the CPU 315 of the MFP 105 ends the process without performing the alternative operation. When the capability of the MFP 105 is equal to that of the other MFP (OWN APPARATUS=ANOTHER APPARATUS in step S2508), the process proceeds to step S2510. In step s2510, the CPU 315 of the MFP 105 notifies the MFP 103 that the MFP 105 is prioritized. A process performed by the MFP having received the notice will be described in detail below with reference to FIG. 26.

The CPU 315 of the MFP 105 inquires of the all MFPs in the network domain about their capability. When there is no MFP having a higher capability than the MFP 105, the process normally exits from the loop process and proceeds to step S2512. In step S2512, the CPU 315 of the MFP 105 starts the alternative operation and ends the process.

The detail process of the MFP 103 when it receives a capability inquiry from the other MFP will be described with reference to FIG. 26. The process is a detail description of process 3008 illustrated in FIG. 30. The process is executed and realized by the CPU 315 of the MFP 103.

In step S2600, the CPU 315 of the MFP 103 receives an inquiry about the capability thereof from the other MFP. In step S2602, the CPU 315 of the MFP 103 returns information indicating the inquired capability (function) to the other MFP.

Figure 26:
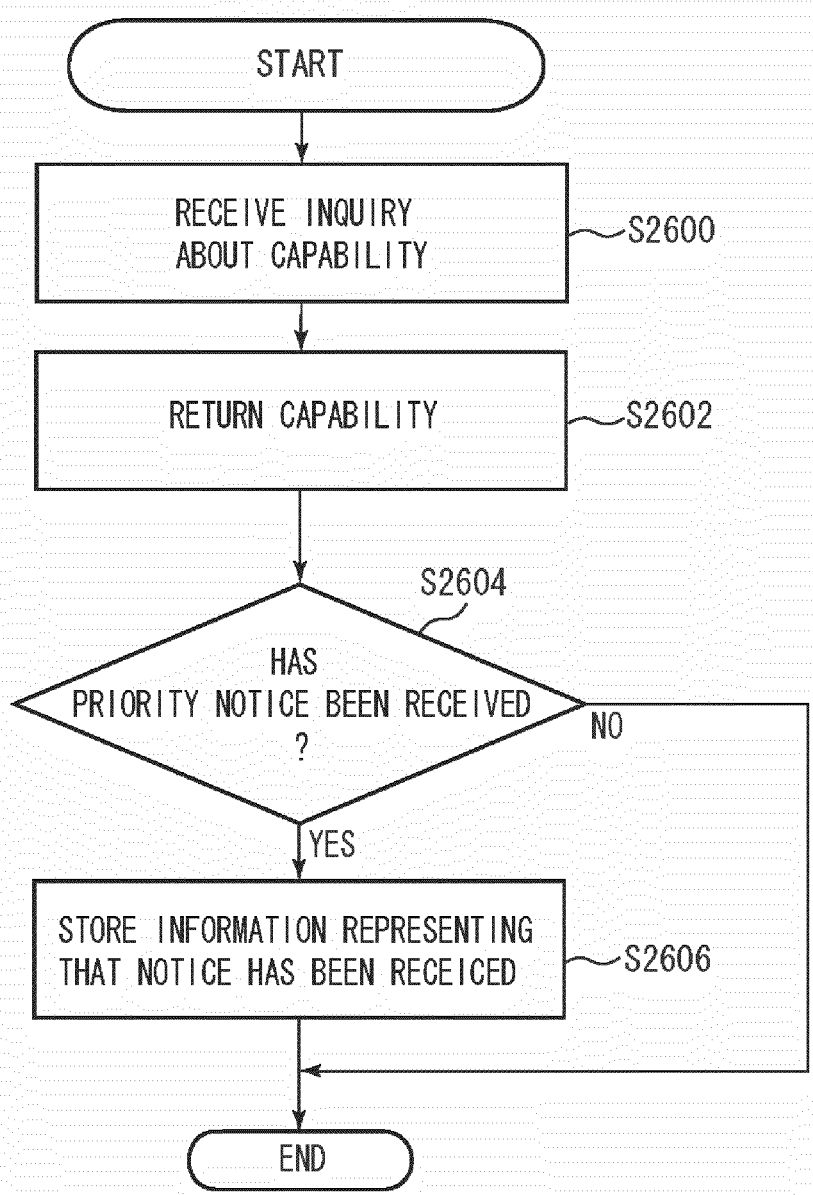
FIG. 26 is a flowchart illustrating a process when an MFP receives a capability inquiry from another MFP.

In step S2604, the CPU 315 of the MFP 103 determines whether priority notice has been received as described in step S2510 of FIG. 26. When own capability is equal to the capability of the other MFP, the other MFP issues the priority notice according to a preceding priority rule. If the priority notice is received (YES in step S2604), the process proceeds to step S2606. In step S2606, the CPU 315 of the MFP 103 stores information representing that the notice has been received in the storage device 313. The storage result is used for determination in step S2500 of FIG. 25.

Figure 27:
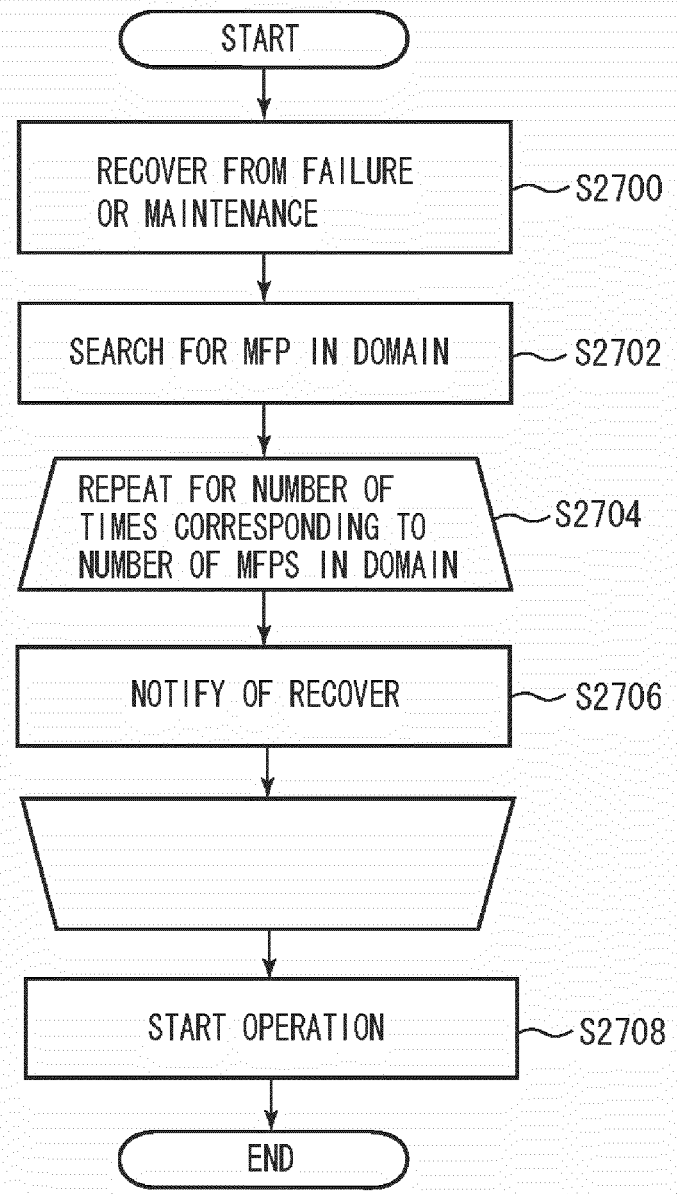
FIG. 27 is a flowchart illustrating a process when an MFP sends notice of recovery at the time the MFP recovers from a failure or maintenance.

A detail process to be executed when the MFP recovered from a failure or maintenance will be described with reference to FIG. 27. It is assumed that the MFP 104 has recovered.

The process is a detail process of the process 3014 illustrated in FIG. 30. The process is executed and realized by the CPU 315 of the MFP 104.

In step S2700, the MFP 104 detects that it has recovered from a failure or maintenance. In step S2702, the CPU 315 of the MFP 104 searches for the MFPs 103 and 105 in the network domain. A loop process starts from step S2704 to step S2706, and is repeated for a number of times corresponding to the number of MFPs 103 and 105 searched in step S2702.

In step S2706, the CPU 315 of the MFP 104 notifies the other MFP that the MFP 104 has recovered. When the notice is transmitted to the all MFPs 103 and 105 in the network domain, the process exits from the loop process and proceeds to step S2708. In step S2708, the CPU 315 of the MFP 104 starts operations as the MFP.

Figure 28:
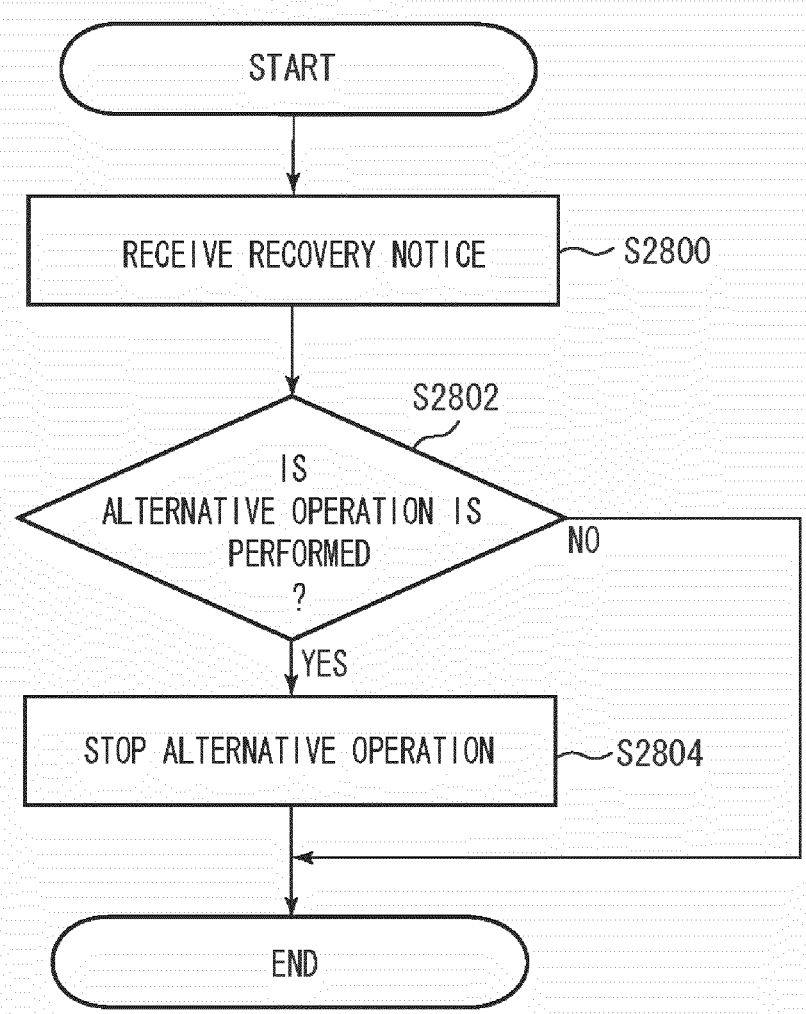
FIG. 28 is a flowchart illustrating a process when an MFP receives notice of recovery from another MFP.

A detail process to be executed when an MFP receives notice of recovery from the other MFP will be described with reference to FIG. 28. It is assumed that the MFP 105 receives the notice of recovery from the other MFP. The process is a detail description of the process 3016 illustrated in FIG. 30. The process is executed and realized by the CPU 315 of the MFP 105.

In step S2800, the CPU 315 of the MFP 105 receives the notice of recovery from the other MFP. In step S2802, the CPU 315 of the MFP 105 determines whether the MFP 105 is performing the alternative operation. When it is determined that the alternative operation is being performed by the MFP 105 (YES in step S2802), the CPU 315 of the MFP 105 proceeds to step S2804 and stops the alternative operation.

As described above, according to the present embodiment, when the MFP which stores information (data, application, and license information) is not available for a long period of time, the information is backed up to be shared among the MFPs of the office system. Accordingly, when a failure has occurred in the MFP, or the maintenance is performed in the MFP, the information can quickly and easily be used in the MFP to be alternatively operated. Further, only the latest information or minimum information may be backed up.

When the MFP recovered from the failure or the maintenance, the alternative operation for the other MFP can be stopped and the office system can recover the original state easily.

When the MFP is not available for a long period of time due to a failure or maintenance, the other MFP in the office system is notified of the unavailability. Accordingly, the other MFP can detect the failure of the MFP and timing to start the alternative operation. Further, when the MFP is not available for a long period of time, the unavailability is notified by an operation of a user or a service engineer, thus, it is possible to handle a case in which a failure occurs in the network function.

Information requiring a license to use is arbitrated among the MFPs in the office system using peer-to-peer communication. Thus, it can prevent MFPs more than a number of effective licenses from operating data or application programs. Further, since the MFP to perform an alternative operation is selected based on a priority order, or a high capability, it is possible to appropriately determine the other MFP for the alternative operation from a plurality of MFPs.

The criteria for selecting the MFP include any of the capability of color printing, the printing speed, the image quality and the storage device capacity. Thus, it is possible to select the MFP for the alternative operation according to a function request for the MFP.

The license free information can be selected to be available in the all MFPs. Thus, the alternative operation for the license free information can be performed by not only a specific alternative MFP but also the all MFPs in the office system.

When the MFP is restored from a failure or maintenance, the other MFP in the office system is notified of recovery. Therefore, the MFP which is performing the alternative operation can be notified of timing of stopping the alternative operation. Further, the MFP alternatively operating stops the alternative operation upon reception of the notice of recovery. Thus, the system can automatically recover the original state.

In the above embodiment, the image processing system of the present invention is installed in the office system in a company office. However, the installation is not limited to the office system. The image processing system of the present invention may be installed according to various use.

The present invention can be implemented by executing the following processes. More specifically, program codes of software realizing the functions of the above-described embodiments are stored on a storage medium. The storage medium is supplied to a system or an apparatus. Further, a computer (a CPU or a micro processing unit (MPU)) of the system or apparatus reads the program codes stored on the storage medium.

In this case, the program codes read from the storage medium themselves realize the functions of the above-described embodiment. The program codes and the storage medium storing the program codes are included in the present invention.

The storage medium for supplying the program codes may be any one of a floppy disk, a hard disk, a magneto-optical disk, a compact disk read only memory (CD-ROM), a compact disk recordable (CD-R), a compact disk rewritable (CD-RW), a digital versatile disk read only memory (DVD-ROM), a DVD-RAM, a DVD-RW, a DVD+RW, a magnetic tape, a non-volatile memory card, and a ROM. The program codes may be downloaded via a network.

The program codes read by a computer may be executed to realize the functions of the embodiments. Thus realized functions are included in the present invention. In addition, the actual processes are partially or entirely executed by an operating system (OS) operating on a computer based on the program codes. The functions of the embodiments maybe realized by the processes and are included in the present invention.

Further, the functions of the above-described embodiments may be realized by the following processes and are also included in the present invention. The program codes read from the storage medium are written into a memory included in an expansion board inserted into a computer or an expansion unit connected to the computer. Then, a CPU included in the expansion board or expansion unit may partially or entirely perform the actual processes based on an instruction of the program codes.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-125935 filed May 13, 2008, which is hereby incorporated by reference herein in its entirety.

What is claimed is:

1. An image processing system including a first image processing apparatus and a plurality of other image processing apparatuses which are connected with each other via a network, the image processing system comprising:

a sharing unit included in at least the plurality of other image processing apparatuses and configured to share an application stored in the first image processing apparatus by storing the application in each of the plurality of other image processing apparatus, the first image processing apparatus storing license information not stored in the plurality of the other image processing apparatuses;

a determination unit configured to determine an image processing apparatus to activate the shared application, from among the plurality of other image processing apparatuses when a failure occurs in the first image processing apparatus;

an alternative operation unit configured to perform an operation replacing a function of the first image processing apparatus which requires a license by activating the shared application of the image processing apparatus determined by the determination unit to avoid violating any license agreement; and a recovery notifying unit configured to notify the plurality of other image processing apparatuses of a notice of recovery which represents recovery of the first image processing apparatus when the failure is recovered in the first image processing apparatus, wherein the alternative operation by the alternative operation unit is stopped based on the notice of recovery notified by the recovery notification unit.

2. The image processing system according to claim 1, wherein timing for the application to be shared by the sharing unit is timing at which the application is installed in the first image processing apparatus.

3. The image processing system according to claim 1, further comprising a notifying unit configured to notify the plurality of other image processing apparatuses that the failure occurs in the first image processing apparatus when the failure occurs in the first image processing apparatus.

4. The image processing system according to claim 1, wherein at least one of the plurality of other image processing apparatuses includes a detection unit configured to detect whether the failure occurs in the first image processing apparatus by performing a polling operation of the first image processing apparatus at a predetermined interval.

5. The image processing system according to claim 1, wherein the determination unit determines either one of the plurality of other image processing apparatuses based on a previously-set priority order.

6. The image processing system according to claim 1, wherein the determination unit selects either one of the plurality of other image processing apparatuses based on a capability of the other image processing apparatuses.

7. The image processing system according to claim 6, wherein the capability includes a capability of color printing, a printing speed, image quality, and capacity of the storage unit.

* * * * *